United States Patent [19]

Yamaji et al.

[11] 4,317,742
[45] Mar. 2, 1982

[54] OXYGEN SCAVENGER COMPOSITION, HEAT-GENERATING COMPOSITION AND HEAT-GENERATING STRUCTURE

[75] Inventors: Teizo Yamaji, Yamaguchi; Eishin Yoshisato, Iwakuni, both of Japan

[73] Assignee: Teijin Limited, Osaka, Japan

[21] Appl. No.: 14,640

[22] Filed: Feb. 23, 1979

[30] Foreign Application Priority Data

| Feb. 24, 1978 | [JP] | Japan | 53-19911 |
| Mar. 8, 1978 | [JP] | Japan | 53-25473 |
| Jun. 9, 1978 | [JP] | Japan | 53-68926 |
| Jul. 24, 1978 | [JP] | Japan | 53-89365 |
| Jul. 24, 1978 | [JP] | Japan | 53-89366 |
| Jul. 24, 1978 | [JP] | Japan | 53-89367 |

[51] Int. Cl.$^3$ .................................. C09K 5/00
[52] U.S. Cl. ........................ 252/188; 252/188.3 R; 252/389 R; 252/400 R; 423/219; 426/262; 426/541
[58] Field of Search ............... 252/70, 181.7, 188, 252/188.3 R, 389 R, 400 R, 408; 423/219, 269; 422/7; 424/154, 155, 157, 163, 162; 426/262, 541

[56] References Cited

U.S. PATENT DOCUMENTS

| 3,903,317 | 9/1975 | Cart | 252/407 X |
| 4,043,937 | 8/1977 | Kiss et al. | 252/407 X |
| 4,093,424 | 6/1978 | Yoshida et al. | 252/70 X |
| 4,113,652 | 9/1978 | Yoshikawa et al. | 252/188 X |
| 4,230,595 | 10/1980 | Yamaji et al. | 252/188 |

*Primary Examiner*—J. L. Barr
*Attorney, Agent, or Firm*—Sherman & Shalloway

[57] ABSTRACT

An oxygen scavenger composition consisting essentially of
[I] as essential components,
  (a) an alkali metal sulfide, and
  (b) at least one oxidation promoter selected from the group consisting of silica, alumina, silica-alumina, silica-magnesia and inorganic materials containing one of them as a main ingredient; and
[II] as optional components,
  (c) at least one oxidation promoter aid,
  (d) a water-insoluble or sparingly water-soluble, inert filler, and/or
  (e) water in a hydrous or hydrated condition, a heat-generating composition of said composition being capable of scavenging at least 5 ml of oxygen per gram of the composition in air at 20° C. during the period of one hour after oxidation reaction has substantially begun and a heat-generating structure comprising said composition and a film having an oxygen permeability of 0.01 to 50 cc/cm$^2$·min.·O$_2$ partial pressure (1 atm.), said film covering the composition over an area of 0.2 to 10 cm$^2$ per gram of said composition.

15 Claims, No Drawings

OXYGEN SCAVENGER COMPOSITION, HEAT-GENERATING COMPOSITION AND HEAT-GENERATING STRUCTURE

This invention relates to an oxygen scavenger composition, an oxygen-scavenging heat-generating composition, and to a heat-generating structure composed of such a composition and an oxygen-permeable film covering said composition.

More specifically, this invention relates to an oxygen scavenger composition which on contact with oxygen in the air, easily reacts chemically with oxygen to absorb it; a heat-generating composition which utilizes the heat of chemical reaction which is generated incident to the absorption of oxygen; and to a heat-generating structure which controls the contact between the aforesaid composition and oxygen as a result of covering the heat-generating composition with a suitable oxygen-permeable film.

The oxygen scavenger composition of this invention is characterized by capturing oxygen by a chemical reaction upon contact with it. Hence, in a closed vessel, it is suitable for capturing oxygen within the vessel and making the atmosphere within the vessel oxygen-free or markedly reducing the oxygen content of the atmosphere.

The heat-generating composition of this invention is characterized by capturing oxygen by a chemical reaction upon contact with it, and consequently generating the heat of reaction which can be fully utilized as a heat source. Accordingly, it is suitable for giving without danger a required amount of heat to an object to be heated or warmed in an open system where enough oxygen is supplied.

The heat-generating structure of this invention is adapted to generate a controlled amount of heat as a result of covering the heat-generating composition of this invention with a suitable oxygen-permeable film. Hence, it is suitable for use in various applications which require controlled amounts of heat and controlled temperatures.

Prior techniques for producing an oxygen-free condition or a condition of reduced oxygen content within a closed vessel are practiced, for example, in the preservation of foodstuffs. They include, for example, (1) an inert gas replacing method in which the atmosphere is replaced by an inert gas such as carbon dioxide gas or nitrogen, and (2) a vacuum packing method in which a container having a foodstuff enclosed therein (the preservation system) is evacuated.

These methods, however, are complicated in the operations employed, and it is extremely difficult, or impossible, to produce an oxygen-free or oxygen-decreased condition once it has been destroyed. Accordingly, they cannot find convenient household applications.

Methods for preserving foodstuffs by removing oxygen from packaging containers have previously been suggested. They include, for example, (3) a method which involves placing within a packaging container a composition consisting of sodium hydrosulfite as a main ingredient, calcium hydroxide or sodium bicarbonate, activated carbon, and water (see Japanese Patent Publication No. 19,729/72), and (4) a method which comprises placing a sulfite salt and activated carbon in a packaging container (see Japanese Patent Publication No. 12,471/76).

According to the method (3), the composition requires the presence of free water, and is therefore limited in handling and in the field of use. Moreover, since the reaction occurs abruptly because of the presence of water, the rate of capturing oxygen is difficult to control. In this regard, too, the composition is limited in handling and in the field of use.

The method (4) has the disadvantage that sulfurous acid gas is generated inevitably, and it is difficult to use in the preservation of foodstuffs and corrosive materials. Hence, the field of use is limited.

On the other hand, conventional heat-generating compositions include (5) a composition comprising iron carbide and an alkali sulfide (see Japanese Laid-Open Patent Publication No. 108382/77), and (6) a composition comprising a carbonaceous material and an alkali sulfide (see Japanese Laid-Open Patent Publication No. 108383/77). These heat-generating compositions generate the heat of reaction by absorbing oxygen, but have the practical disadvantage that the total amount of heat generated is not entirely large. In addition, the composition (5) is not suitable as a material consumed industrially in large quantities, because it contains special and expensive iron carbide. Furthermore, the composition (6) containing activated carbon as the carbonaceous material has the defect that the amount of heat generated is not sufficient.

It is an object of this invention to provide an inexpensive sanitary oxygen scavenger composition which is suitable for easily capturing oxygen present in an atmosphere within a closed container to produce an oxygen-free condition therein or to markedly reduce the oxygen content of the atmosphere.

According to this invention, the speed of oxygen capturing can be widely changed by changing the constituent proportions of the oxygen scavenger composition of this invention, and therefore, the amount of heat generated as a result of oxygen capturing or the speed of heat generation can be widely changed. Accordingly, another object of this invention is to provide a heat-generating composition suitable for heating or warming various materials.

Still another object of this invention is to provide a heat-generating structure composed of the heat-generating composition of this invention having such superior performances and a suitable oxygen-permeable film covering the composition, which can be utilized easily and conveniently.

Other objects and advantages of this invention will become more apparent from the following description.

According to this invention, there is first provided an oxygen scavenger composition consisting essentially of (a) an alkali metal sulfide (component A), and
(b) at least one oxidation promoter (component B) selected from the group consisting of silica, alumina, silica-alumina, silica-magnesia and inorganic materials each containing one of said materials as a main ingredient; and optionally,
(c) at least one oxidation promoter aid (component C) selected from the group consisting of copper, cerium, tin, lead, chromium, selenium, tellurium, manganese, rhenium, iron, cobalt, nickel, ruthenium, rhodium, palladium, osmium, iridium and platinum, and compounds of said metals,
(d) a water-insoluble or sparingly water-soluble, inert filler (component D), and/or
(e) water (component E) to provide a hydrous or hydrated condition.

The oxygen scavenger composition of this invention contains the alkali metal sulfide (component A) and the oxidation promoter (component B) as essential ingredients. Optionally, it may contain the oxidation promoter aid (component C), the filler (component D), and/or non-free water (component E). Other components which the oxygen scavenger composition of this invention may contain are limited to the aforesaid components C, D and E, and the composition is substantially free from any other ingredients.

Specifically, the oxygen scavenger composition of this invention embraces (1) a composition consisting essentially of the alkali metal sulfide (A) and the oxidation promoter (B), (2) a composition consisting essentially of the alkali metal sulfide (A), the oxidation promoter (B) and the oxidation promoter aid (C), (3) a composition consisting essentially of the alkali metal sulfide (A), the oxidation promoter (B) and the filler (D), (4) a composition consisting essentially of the alkali metal sulfide (A), the oxidation promoter (B), and the non-free water (E), (5) a composition consisting essentially of the alkali metal sulfide (A), the oxidation promoter (B), the oxidation promoter aid (C), and the filler (D), (6) a composition consisting essentially of the alkali metal sulfide (A), the oxidation promoter (B), the oxidation promoter aid (C) and the non-free water (E), (7) a composition consisting essentially of the alkali metal sulfide (A), the oxidation promoter (B), the filler (D) and the non-free water (E), and (8) a composition consisting essentially of the alkali metal sulfide (A), the oxidation promoter (B), the oxidation promoter aid (C), the filler (D), and the non-free water (E).

These compositions have their own characteristic features according to their constituents. They are common however in that they comprise a novel combination of the alkali metal sulfide (A) and the oxidation promoter (B), and basically by the presence of the oxidation promoter (B), the reaction between the alkali metal sulfide (A) and oxygen proceeds at such a speed that the composition can be utilized as an oxygen scavenger.

The characteristic features of the oxygen scavenger compositions (2) to (8) of this invention are briefly described below on the basis of the characteristics of the composition (1).

The composition (2) generally has an increased speed of capturing oxygen over the composition (1) because of the presence of the oxidation promoter aid (C). A number of experiments conducted by the present inventors have shown that only specified metals and metal compound which are large in number are useful as aids for promoting the oxidation of component A in the presence of component B.

The composition (3) containing the filler (D) has improved gas permeability and heat insulation and is prevented from localized overheating. For example, when the filler has a low bulk density, the composition (3) generally has improved gas permeability, and its speed of capturing oxygen physically and the amount of heat generated is further increased. When the filler has a high bulk density, the composition (3) generally has a lowered gas permeability, and its speed of capturing oxygen and the amount of heat generated are reduced. Selection of the filler makes it possible to control the speed of capturing oxygen physically to some extent, and also to control the amount of oxygen captured.

The composition (4) is characterized by containing the non-free water (E), and generally has a much higher speed of capturing oxygen than the composition (1). Hence, in some case, the amount of heat generated per unit time is very large, and the composition is suitable for used as a heater. The investigations of the present inventors have led to the discovery that the presence of water is not essential during the reaction of component A with oxygen, but when water is caused to be present as non-free water, it is effectively utilized in the reaction, and the speed of capturing oxygen is increased remarkably.

The composition (5) contains both the oxidation promoter aid (C) and the filler (D), and generally has the characteristic features of the compositions (2) and (3). For example, this composition can be the one having an increased speed of capturing oxygen. Or even when its speed of oxygen removal is latently enhanced by the oxidation promoter aid, this speed can be maintained low by the filler.

The composition (6) contains the oxidation promoter aid (C) and the non-free water (E), and generally has the characteristic features of the two compositions (2) and (4). Hence, the speed of capturing oxygen by the alkali metal sulfide is very much increased.

The composition (7) contains the filler (D) and the non-free water (E), and generally, has the characteristic features of the two compositions (3) and (4). Selection of the filler (D) makes it possible to increase the high oxygen scavenging ability inherently possessed chemically and latently over the composition (3), or to maintain it at a lower level. The performance of the composition (7) can generally be better than those of the compositions (3) and (4).

The composition (8) is characterized by containing all of the oxidation promoter aid (C), the filler (D) and the non-free water (E). Therefore, by varying the kinds of these components and their mixing proportions, it is possible to design oxygen scavenger compositions having a very broad range of applications.

The composition (1) consisting essentially of the alkali metal sulfide (A) and the oxidation promoter (B) which are contained commonly in all of the aforesaid compositions (1) to (8) is a basic composition of the oxygen scavenger composition of this invention. It has been disclosed for the first time by the present inventors that such a composition can exhibit an oxygen scavenging activity.

Among the aforesaid oxygen scavenger compositions, the compositions (4), (6), (7) and (8) are preferred. The compositions (6) and (8) are more preferred, and the composition (8) which contains the non-free water (E) is most preferred.

The components (A) to (E) which constitute the oxygen scavenger compositions of this invention are specifically described below.

(a) The alkali metal sulfide as component A denotes monosulfides or polysulfides or alkali metals. These sulfides are expressed by the following formula $$M_2S_x \qquad (1)$$

wherein M represents an alkali metal, and x is a positive number of 1 to 10, preferably a positive number of 1 to 5.

Examples of the alkali metal sulfide include sulfides of lithium such as $Li_2S$; sulfides of sodium such as $Na_2S$, $Na_2S_2$, $Na_2S_3$, $Na_2S_4$ and $Na_2S_5$; sulfides of potassium such as $K_2S$, $K_2S_2$, $K_2S_3$, $K_2S_5$ and $K_2S_6$; sulfides of rubidium such as $Rb_2S$, $Rb_2S_2$, $Rb_2S_3$ and $Rb_2S_6$; and sulfides of cesium such as $Cs_2S$, $Cs_2S_2$, $Cs_2S_4$, $(CsS_2)$, and $Cs_2S_6$.

Of these, the sodium sulfides and potassium sulfides are preferred, and the sodium sulfides are especially preferred. The alkali metal sulfide can be used in the form of hydrate, and generally, this is preferred. Examples of such hydrates include sodium sulfide hydrates such as $Na_2S.9H_2O$, $Na_2S.6H_2O$, $Na_2S.5.5H_2O$, $Na_2S.5H_2O$, $Na_2S.4.5H_2O$ and $Na_2S.2.7H_2O$; potassium sulfide hydrates such as $K_2S.2H_2O$, $K_2S.5H_2O$, $K_2S.4.5H_2O$ and $K_2S_4.2H_2O$; rubidium sulfide hydrates such as $Rb_2S.4H_2O$; and cesium sulfide hydrates such as $CsS.4H_2O$ and $CsS_2.H_2O$. Among these, the sodium sulfide hydrates and the potassium sulfide hydrates are preferred. Especially preferred are the sodium sulfide hydrates or a mixture thereof, above all $Na_2S.9H_2O$, $Na_2S.5H_2O$, and $Na_2S.2.7H_2O$, because of their availability and superior oxygen scavenging ability.

These alkali metal sulfides which constitute the oxygen scavenger composition of this invention are relatively stable compounds which at ordinary temperatures, do not capture oxygen nor are oxidized when exposed to an oxygen atmosphere. They capture oxygen only in the presence of an oxidation promoter (B).

The suitable amount of the alkali metal sulfide is 5 to 90% by weight, as anhydride, based on the entire composition. Preferably, its amount is 10 to 80% by weight on the same basis.

(b) The oxidation promoter as component B which constitutes the oxygen scavenger composition of this invention is selected from the group consisting of silica, alumina, silica-alumina, silica-magnesia, and inorganic materials each containing one of these compounds.

Silica denotes silicon dioxide ($SiO_2$) which may either be crystalline or amorphous.

Alumina denotes aluminum oxide ($Al_2O_3$) which may either be α-alumina, β-alumina or γ-alumina.

Silica alumina denotes aluminum silicate which consists of a silica ($SiO_2$) unit and an alumina ($Al_2O_3$) unit. For example, the weight ratio of the silica unit to the alumina unit is 1:99 to 99:1, preferably 5:95 to 95:5, especially preferably 10:90 to 90:10.

Silica-magnesia denotes magnesium silicate consisting of a silica unit and a magnesia (MgO) unit. For example, the weight ratio of the silica unit to the magnesia unit is from 1:99 to 99:1, preferably from 5:95 to 95:5, especially from 10:90 to 90:10.

The inorganic material containing one of silica, alumina, silica-alumina or silica-magnesia as a main ingredient is a naturally occurring or synthetic material containing at least 50% by weight, preferably at least 60% by weight, especially preferably at least 65% by weight, of one of the above oxides, and includes the following.

(i) Silica-containing materials

Silica rock, siliceous sand, powdered quartz, diatomaceous earth, etc.

(ii) Alumina-containing materials

Bauxite, boemite ($Al_2O_3.H_2O$), diaspore ($Al_2O_3.H_2O$), gibbsite ($Al_2O_3.3H_2O$), bayerite, aluminous shale, clay, etc.

(iii) Materials containing silica-alumina

Feldspar, kaolin, clay, "Kibushi" clay, bentonite (main ingredient $Al_2O_3.4SiO_2.nH_2O$), acid terra alba, active terra alba, agalmatolite (main ingredient pyrophillite $Al_2O_3.4SiO_2.H_2O$), sericite, pyrophyllite, mica (e.g., muscovite), nacrite, various zoelites such as aluminosilicates, montmorillonite, molecular sieves such as molecular sieves 3A, 4A, 5A and 13X, etc.

(iv) Materials containing silica-magnesia

Talc, olivine, India mica, asbestos, serpentine, magnesium meta-silicate, etc.

The oxidation promoter as component B can be used in the form of synthetic products, naturally occurring products and commercially available products, and it is not particularly necessary to fire it prior to use. When the alkali metal sulfide (A) is used in the form of anhydride, it is preferred to use the component B without firing. Since the oxidation promoter has the activity of promoting the oxygen scavenging power of the alkali metal sulfide (A), it must have a proper particle diameter in order to obtain good contact between these two components. For example, the particle diameter is not more than 300 microns, preferably not more than 100 microns, and more preferably not more than 50 microns. The amount of the oxidation promoter (B) varies according to the properties required of the final composition. For example, the speed of oxygen scavenging is reduced with decreasing amount of the oxidation promoter, but the final composition can be used over a long period of time. On the other hand, the speed of oxygen scavenging generally increases with increasing amount of the oxidation promoter. However, the amount of oxygen scavenged per unit weight of the composition decreases with increasing amount of the oxidation promoter. Accordingly, the content of the oxidation promoter is determined by adjusting the speed of oxidation and the amount of oxygen scavenged according to the purpose of use. Generally, when the oxidation promoter is included in a large amount, it also exhibits the function of promoting the oxidation reaction and simultaneously produces a filling effect. In such a case, the effect of adding a filler can be imparted to the composition without adding the filler (D).

When the amount of the alkali metal sulfide (A) is 5 to 90% by weight based on the entire composition, the content of the oxidation promoter (B) is preferably adjusted to at least 10 parts by weight per 90 parts by weight of the component A.

(a) The oxidation promoter aid (C) optionally included in the oxygen scavenger composition of this invention is considered to aid in the action of the oxidation promoter (B) to oxidize the alkali metal sulfide (A).

The oxidation promoter (C) includes metals of Groups I, II, IV, VI, VIII, and VIII of the periodic table selected from the group consisting of copper, cerium, tin, lead, chromium, selenium, tellurium, manganese, rhenium, iron, cobalt, nickel, ruthenium, rhodium, palladium, osmium, iridium and platinum; and compounds of these metals. The metal compounds include, for example, oxides, hydroxides, inorganic acid salts such as carbonic acid salts or mineral acid salts, organic acid salts such as organic monocarboxylic acid salts, and complex compounds. Of these, the oxides, hydroxides, carbonates, mineral acid salts and $C_1$-$C_{20}$ organic monocarboxylates are preferred. Especially preferred are the oxides, hydroxides, carbonates, mineral acid salts and $C_1$-$C_{20}$ organic monocarboxylates of copper, cerium, lead, selenium, manganese, iron cobalt, nickel and palladium.

Examples of the inorganic acid salts are hydrohalic acid salts such as hydrochlorides, hydrobromides, hydrofluorides and hydriodides, mineral acid salts such as nitrates, sulfates and phosphates, carbonates, nitrites, sulfites, phosphites, bicarbonates, bisulfates, bisulfites, biphosphates, biphosphites, perchlorates, and periodates.

Examples of the organic acid salts are salts of organic monocarboxylic acids such as aliphatic, alicyclic or aromatic monocarboxylic acids, salts of organic sulfonic acids and salts of organic phosphoric acids. The complex compounds denote complex salts or chelates comprised of dicarboxylic acids, hydroxycarboxylic acids, aminocarboxylic acids, polyamines, aromatic amines, hydroxyaldehydes, $\beta$-diketones, and phenol derivatives.

Specific examples of the metal compounds as the oxidation promoter aid (C) are listed below.

(1) Oxides

Chromic oxides ($Cr_2O_3$), chromium trioxide ($CrO_3$), manganese dioxide ($MnO_2$), cobalt sesquioxide ($Co_2O_3$), cobalt oxide (CoO), ferric oxide ($Fe_2O_3$), triiron tetroxide ($Fe_3O_4$), nickel oxide (NiO), nickel sesquioxide ($Ni_2O_3$), cuprous oxide ($Cu_2O$), cupric oxide (CuO), stannous oxide (SnO), stannic oxide ($SnO_2$), lead monoxide (PbO), lead dioxide ($PbO_2$), trilead tetroxide ($Pb_3O_4$), palladium oxide (PdO, $PdO_2$) rhodium oxide ($Rh_2O_3$), ruthenium oxide ($RuO_2$), platinum oxide ($PtO_2$), iridium oxide ($Ir_2O_3$), osmium oxide ($OsO_4$), rhenium oxide ($Re_2O_7$), and cerium oxide ($CeO_2$).

(2) Hydroxides

Chromium hydroxide [$Cr(OH)_3$], cobalt hydroxide [$Co(OH)_2$], iron hydroxide [$Fe(OH)_3$], nickel hydroxide [$Ni(OH)_2$], cuprous hydroxide (CuOH), cupric hydroxide [$Cu(OH)_2$], lead hydroxide [$Pb(OH)_2$], and cerium hydroxide [$Ce(OH)_3$, $Ce(OH)_4$].

(3) Carbonates

Chromium carbonate, manganese carbonate, iron carbonate, cobalt carbonate, nickel carbonate, copper carbonate, lead carbonate, and cerium carbonate [$Ce_2(CO_3)_3$].

(4) Halides

Chlorides such as palladium chloride ($PdCl_2$), rhodium trichloride ($RhCl_3$), ruthenium chloride ($RuCl_3$), platinous chloride ($PtCl_2$), platinic chloride ($PtCl_4$), chloroplatinates (e.g., $K_2PtCl_6$, $Na_2PtCl_4$), iridium trichloride ($IrCl_3$), osmium trichloride ($OsCl_3$), rhenium pentachloride ($ReCl_5$), stannous chloride ($SnCl_2$), stannic chloride ($SnCl_4$), chromium chloride ($CrCl_3$), manganese chloride ($MnCl_2$), cobalt chloride ($CoCl_2$), ferrous chloride ($FeCl_2$), ferric chloride ($FeCl_3$), nickel chloride ($NiCl_2$), cuprous chloride (CuCl), cupric chloride ($CuCl_2$), lead chloride ($PbCl_2$) and cerium chloride ($CeCl_3$); bromides such as palladium chloride ($PdCl_2$), chromium bromide ($CrBr_3$), manganese bromide ($MnBr_2$), cobalt bromide ($CoBr_2$), iron bromide ($FeBr_3$), nickel bromide ($NiBr_2$), copper bromide (CuBr, $CuBr_2$), and lead bromide ($PbBr_2$); and iodides such as chromium iodide ($CrI_2$), manganese iodide ($MnI_2$), cobalt iodide ($CoI_2$), iron iodide ($FeI_2$), nickel iodide ($NiL_2$), copper iodide (CuI), lead iodide ($PbI_2$), and stannous iodide ($SnI_2$).

(5) Nitrates

Chromium nitrate, manganese nitrate, cobalt nitrate, ferrous nitrate, ferric nitrate, nickel nitrate, copper nitrate, lead nitrate, palladium nitrate [$Pd(NO_3)_2$], rhodium nitrate [$Rh_2(NO_3)_2$], ceric ammonium nitrate [$Ce(NO_3)_4 \cdot 2NH_4NO_3$], and cerium nitrate [$Ce(NO_3)_3$, $Ce_2(NO_3)_4$].

(6) Sulfates

Chromium sulfate, manganese sulfate, cobalt sulfate, ferrous sulfate, ferric sulfate, nickel sulfate, copper sulfate, lead sulfate ($PbSO_4$), stannous sulfate ($SnSO_4$), palladium sulfate ($PdSO_4$), rhodium sulfate [$Rh_2(SO_4)_3$], cerium sulfate [$Ce_2(SO_4)_3$, $Ce(SO_4)_2$], ceric ammonium sulfate [$Ce(SO_4)_2 \cdot 2(NH_4)_2SO_4$], and cerous ammonium sulfate [$Ce_2(SO_4)_3 \cdot 2NH_4NO_3$].

(7) Phosphates

Chromium phosphate, manganese phosphate, manganese hydrogen phosphate, cobalt phosphate, ferrous phosphate, ferric phosphate, nickel phosphate, and copper phosphate.

(8) Organic monocarboxylic acid salts

Acetates such as chromic acetate, manganese acetate, cobalt acetate, ferrous acetate, ferric acetate, nickel acetate, copper acetate, palladium acetate, lead acetate [$Pb(OCOCH_3)_2$], lead tetracetate [$Pb(OCOCH_3)_4$], cerium acetate [$Ce(OCOCH_3)_3$, $Ce(OCOCH_3)_4$], and stannous acetate [$Sn_2(OCOCH_3)_4$]; formates such as cobalt formate, manganese formate, copper formate or nickel formate; higher aliphatic carboxylates such as the propionates, butyrates, oleates and stearates of chromium, cobalt, nickel, manganese and copper, lead stearate [$Pb(C_{18}H_{35}O_2)_2$], and stannous stearate [$Sn(C_{18}H_{35}O_2)_2$]; aromatic carboxylates such as cobalt benzoate, manganese benzoate, palladium benzoate, rhodium benzoate, tin benzoate, lead benzoate and cerium p-toluate; and alicyclic carboxylates such as chromium naphthenate, cobalt naphthenate, manganese naphthenate and copper naphthenate.

(9) Complex compounds

Oxalates, citrates, lactates and salicylates of chromium, cobalt, nickel, manganese and copper; acetylacetonates; acetylacetonates of metals of Group VIII such as palladium acetylacetonate or platinum acetylacetonate, or chelate compounds of these metals with ethylenediamine, dipyridyl and salicylaldoxime; and lead citrate, lead oxalate, lead $\alpha$-aminoacetate ($Pb \cdot C_2H_5O_2N$), stannous oxalate ($SnC_2O_4$), cerium oxalate, and cerium acetylacetonate [$Ce(C_5H_7O_2)_3$, $Ce(C_5H_7O_2)_4$].

These oxidation promoter aids may be anhydrides or compounds containing water of crystallization. They can also be used in the hydrous state. These compounds may be used singly or as a mixture of two or more of these.

When the amount of the alkali metal sulfide (A) is 5 to 90% by weight based on the entire composition, the amount of the oxidation promoter aid (C) is such that the total amount of it and the oxidation promoter (B) is at least 10% by weight based on the entire composition.

More preferably, the amount of the oxidation promoter aid (C) is 1 to 100 parts by weight, particularly 2 to 50 parts by weight, per 100 parts by weight of the oxidation promoter (B).

Generally, oxygen scavenger compositions of this invention containing the oxidation promoter aid have a higher speed of oxygen scavenging and a larger amount of heat generated per unit time than those not containing the oxidation promoter aid. However, if the content of the oxidation promoter aid (C) in the entire composition is too large, the amount of oxygen scavenged per unit weight of the composition tends to become small. Generally, when the oxidation promoter aid is used in a relatively large amount, the oxidation promoter aid itself concurrently has the action of a filler.

(d) The filler (D) as an optional component of the oxygen scavenger composition of this invention is a water-insoluble or sparingly water-soluble, inert material. The term "inert", used herein, means that an oxygen scavenger composition of this invention consisting of the alkali metal sulfide and the filler shows a slower rate of oxygen scavenging than a composition of this invention consisting of the alkali metal sulfide and the oxidation promoter.

Oxygen scavenger compositions of this invention containing such a filler generally have a faster speed of oxygen scavenging or a larger amount of oxygen scavenged than those compositions of this invention which do not contain the filler. The filler also serves to improve the gas permeability, heat insulation and heat conduction and prevent localized overheating. Binders or lubricants used in the molding of the composition of this invention and deodorants are also included within the definition of fillers in accordance with this invention. Specific examples of the filler are described below. Fillers conveniently used to impart gas permeability or heat insulation include carbonaceous materials such as charcoal, activated carbon and graphite; metal carbides such as silicon carbide and iron carbide; metal nitrides such as silicon nitride and iron nitride metal oxides such as magnesium oxide, zinc oxide, calcium oxide, zirconium oxide and titanium oxide; metal salts such as magnesium sulfate, sodium sulfate and calcium carbonate; glass powder and stone powder; and organic fillers such as ceellulose, synthetic resin powders, wood powders, and wastes of fibers such as cotton, polyesters or polyacrylonitrile. Those which are used conveniently to impart a deodorizing effect include carbonaceous materials such as charcoal, activated carbon and carbon black; organic fillers such as wood powder, pulp and cereal grain powders; and bone powders and plant ashes. Those which are conveniently used to improve the moldability of the resulting composition include binders such as starch, carboxymethyl cellulose, polyvinyl acetate, polyvinyl alcohol and polyolefins (e.g., polyethylene); and lubricants such as metal stearates (e.g., calcium stearate).

These fillers can be used in the hydrous or hydrated state. The amount of the filler (D) may be 1 to 90% by weight based on the entire composition. Too much filler, however, is undesirable because the amount of heat generated per unit weight of the composition generally tends to decrease with increasing amount of the filler and decreasing amount of the alkali metal sulfide (A). In prescribing the amount of the filler, it should be considered that the components B and C also act as a filler. Since the filler plays an important role of improving the gas-permeability and heat insulation of the composition of this invention and of preventing its localized overheating, it is sometimes necessary to use it in a relatively large amount having regard to the other ingredients.

The preferred amount of the filler (D) is 5 to 70% by weight based on the entire composition.

As stated above, the composition of this invention may contain activated carbon. The activated carbon serves to improve heat insulation and gas-permeability and to eliminate odors which may be generated during use of the composition. It has been found that activated carbon also gives an oxygen scavenging composition in accordance with this invention which has an induction period during which the composition does not substantially begin oxygen scavenging even upon contact with oxygen.

For this reason, the composition of this invention containing activated carbon has the advantage that even when it is prepared by mixing the individual ingredients in the air over a relatively long period of time, the oxygen scavenging ability of the resulting composition is still maintained high because of the presence of the induction period. Consideration must, however, be given to the fact that in a composition containing too much activated carbon, the excessively long induction period becomes an undesirable property. Generally, the amount of activated carbon used as the filler is less than 15% by weight, preferably less than 10% by weight, based on the entire composition.

(e) The water as component E optionally included in the oxygen scavenger composition of this invention is water which provides a hydrous or hydrated condition. Accordingly, this means that at least one of the alkali metal sulfide (A) or the oxidation promoter (B), or at least one of components A, B, C and/or D, is in the hydrous or hydrated state. In other words, water to provide a hydrated or hydrous condition means the water held chemically or physically in the composition of this invention in the form of non-free water which does not show a flowing condition.

Water to provide a hydrated condition is generally present as water of crystallization in components A to D, and water to provide a hydrous condition is present as adsorbed water or impregnated water in components A to D. Water in the hydrated state or impregnated water are preferred because they are firmly fixed in the oxygen scavenger composition of this invention.

Oxygen scavenger compositions of this invention containing water (E) generally have a higher speed of oxygen scavenging and a larger amount of oxygen scavenged than those of this invention which do not contain the water (E).

The water (E) is present preferably in an amount of 2 to 75% by weight based on the entire composition. Generally, when the amount of water is more than about 30% by weight based on the weight of the entire composition, it is better to include it as water of crystallization of any one of components A to D than as impregnated water.

When water (E) is included as water of crystallization (for example, when water is included as water of crystallization of sodium sulfide as the alkali metal sulfide (A)), the weight of the water of crystallization based on the entire composition corresponds to the content of water (E).

As stated hereinabove, the oxygen scavenger composition of this invention has a very good ability to scavenge oxygen, and is suitably used to provide an atmosphere which is free of oxygen or contains a markedly reduced amount of oxygen.

The oxygen scavenger composition of this invention includes those compositions which have a very high speed of oxygen scavenging and thus capture oxygen very rapidly within a short period of time, as specifically illustrated by many Examples to be given hereinbelow. It has been found that in such compositions, the heat of reaction generated incident to oxygen scavenging is in such an amount that is fully satisfactory for a material to be warmed or heated.

Thus, according to this invention, there is also provided a heat-generating composition which has the same chemical composition as the oxygen scavenger composition of this invention described hereinabove, and which scavenges at least 5 ml of oxygen per gram of the composition in the air at 20° C. during the period of one hour after the oxidation reaction has substantially begun. The heat-generating composition of this invention is characterized by performing rapid oxygen scavenging after the oxidation reaction has substantially begun. Preferably, the composition scavenges at least 10 ml of oxygen per gram of the composition in the air at 20° C. during the period of 1 hour after the oxidation reaction has substantially begun.

Thus, in a preferred embodiment of this invention, there is provided a heat-generating composition having such heat generating characteristics which consists essentially of (a') a sulfide or sodium or potassium, (b') silica-alumina or silica-magnesia and (e') water as a hydrate of said sulfide, and as optional components, (c') a metal selected from the group consisting of copper, cerium, lead, selenium, manganese, iron, cobalt, nickel and palladium, or an oxide of such a metal, and/or (d') a water-insoluble or sparingly water-soluble, inert filler. In a more preferred embodiment, the aforesaid heat-generating composition of this invention contains 15 to 75% by weight, based on the entire composition, of said sodium or potassium sulfate.

The components (a') to (e') above are respectively within the definitions of components A to E described hereinabove with regard to the oxygen scavenging composition of this invention. Thus, the definition and description of the components (a') to (e') are apparent from the foregoing description.

The oxygen scavenger composition and heat-generating compositions of this invention can be prepared, for example, as follows:

Generally, such compounds can be prepared easily by sufficiently mixing predetermined amounts of components A to D or components A to D in the hydrous or hydrated state in powder form by a mechanical means, or by mixing them while pulverizing.

If the individual components are reduced to a powder prior to mixing, sufficient mixing can be effected within a relatively short period of time to give an intimately mixed composition in accordance with this invention. Generally, in a large-scaled mixing operation, the mixing operation is preferably performed such that the contact between the components A and B occurs in the last place. For example, it is desirable to fully mix the components B to D and then mix the mixture further with the component A; or to first fully mix the components A, C and D, preferably the components A and D, and then mix the mixture with the component B, preferably the components B and C. In the present invention, the components A to D have a particle diameter of not more than 300 microns, preferably not more than 100 microns, especially preferably not more than 50 microns. It is not particularly necessary however to equalize the particle diameters of all of the components.

Generally, the mixing operation, especially the mixing operation involving contact between the components A and B, is desirably carried out in an oxygen-free atmosphere, for example an atmosphere of an inert gas such as nitrogen gas.

The mixing or the pulverizing-mixing operation is carried out, for example, by using a mortar, an agate mortar, a mixing and grinding machine, a ball mill, a gear compounder, an interal mixer, or a V-type mixer.

The resulting intimately mixed oxygen scavenger composition and heat-generating composition of this invention can be molded, as required, into the desired configuration. A tableting machine, an extrusion-molding machine, a roll molding machine, etc. are used for the molding, and the product is obtained in a form suitable for the purpose of use, such as a pellet, bead, rod, block or sheet.

In the molding operation, the compositions of this invention may be simply molded under pressure, or molded after adding a filler, for example a binder such as starch, carboxymethyl cellulose, polyvinyl acetate, polyolefins or polyvinyl alcohol, or a lubricant such as calcium stearate.

The oxygen scavenger composition and heat-generating composition of this invention so produced can be used as an as-prepared powder or as a molded article. It is convenient to use them in the packed state using an air-permeable packaging material such as cellophane and plastic films such as polyester films or paper. The material and structure of the packaging material can be varied depending upon the purpose of use so long as it is air-permeable.

For example, the composition of this invention may be packed with a suitably perforated packaging material and further covered with an oxygen-impermeable packaging material. In use, upon removing the outer covering, the composition contacts oxygen in the open atmosphere and scavenges oxygen. In this way, the oxygen scavenger composition and heat-generating composition of this invention can be used simply and conveniently.

The work of the present inventors has led to the discovery that a heat-generating structure capable of smoothly effecting contact with oxygen and heat generation without localized overheating and therefore, maintaining a readily usable temperature (for example, about 60° C.) between room temperature and 100° C. for long periods of time can be obtained by covering the heat-generating composition of this invention with a film having an oxygen permeability of 0.01–50 cc/cm$^2$·min.·O$_2$ partial pressure (1 atm.) over an area of 0.2 to 10 cm$^2$ per gram of the composition.

Accordingly, the present invention provides the aforesaid heat-generating structure in a very readily utilizable form.

A heat-generating structure obtained by covering the heat-generating composition with a film having an oxygen permeability of 0.05 to 40 cc/cm$^2$·min.·O$_2$ partial pressure (1 atm.) is especially desirable.

The heat-generating structure of this invention may be the one in which the heat-generating composition is covered entirely with the oxygen-permeable film; or it is covered partly with the aforesaid film and the other part, with an oxygen-impermeable material.

The desired heat-generating temperature, amount of heat generated and heat-generating period of time can be obtained by properly controlling the proportion of the area of the oxygen-permeable film.

The degree of air-permeability and the area of the film can be chosen depending upon the end use of the heat-generating structure. For example, when a maximum of temperature is desired, the air-permeability of the covering material is substantially increased, and its area is broadened. When the heat-generating structure is to be used for warming the human body or a therapeutic pack, it is desirable to maintain the structure at a certain fixed temperature below 100° C. for long periods of time.

The oxygen-permeable material may be any material which does not permit leakage of the heat-generating composition and has the aforesaid properties, and there is no particular restriction in regard to the type, thickness and shape of the material. The material may, for example, by variously perforated plastic films, papers, knitted or woven cloths, non-woven cloths, and open-cellular polymeric films. A porous magnetic material and a glass material having a definite shape can also be used. These materials may be produced from polymeric compounds such as polyethylene, polypropylene, nylons, polyesters, acetates, polyvinyl alcohol, cellophane, polymethyl methacrylate and acrylic resins, inorganic fibers such as carbon fibers, glass fibers and asbestos, and natural fibers such as silk and pulp. These materials may be used singly. Alternatively, two or more of these materials may be united by suitable methods, for example, by contact bonding, sewing or bonding by melting. When they have other properties such as heat insulation, heat conduction, hand, touch, hygroscopicity and deodorizing in addition to air permeability, they can be used favorably according to the end uses.

The shape of the heat-generating structure may be selected according to the end uses. For example, a sheet-like shape is usually selected for use in warming and warmpacking of the human body. Furthermore, it can be used as a receptacle or bag molded into the desired shape for heating and warming objects having definite configurations, for example in the heating of bottled and canned foods, and heating of automobile batteries in the cold climate. To increase the efficiency of heating, a thermally insulative material may be provided on the marginal portion of the heat generating structure. To increase the efficiency of heat conduction between the heat-generating structure and an object to be heated, the heat-generating structure may be used in intimate contact with the object to be heated, or the object to be heated may be interposed between the heat-generating structures.

The oxygen scavenger compositions of this invention are inexpensive and sanitary without the generation of corrosive gases. In addition, they inherently possess very good ability to scavenge or capture oxygen. They are suitable for producing simply and conveniently an oxygen free atmosphere or an atmosphere containing a markedly reduced amount of oxygen. Accordingly, they find a wide range of applications, and for example, they are recommended to be used in the following applications.

(i) Antioxidation of oils and fats or materials containing oils and fats

For the prevention of oxidative degradation of "instant" noodles, fried dough cakes, peanuts, butter-fried peanuts, fried beans, popcorns, potato chips, chocolates, feeds in eel culturing, fried rice crackers, flakes of dried bonito, rice bran, powdered milk, refined rice, dairy products, wheat germs, confectionery, dog foods, etc.

(ii) Prevention of degradation of the flavor and teaste of foods

For the prevention of the oxidative degradation involving deterioration in color, flavor and taste of foods such as bread brumbs, dried vegetables, dried seafoods, dried seaweeds, dried mushrooms, smoked foods, dried fruits, laver, coffee beans, black tees, and green tees.

(iii) Antiseptic, moth-proofing, antibacterial and moldproof applications

For the prevention of degeneration and spoilage by molds, bacteria or moths of bread, rice cake, Japanese unbaked cakes, various fresh raw foods such as vegetables, fruits, fishes, beefs, porks, and fowl, and books.

(iv) Prevention of degeneration of various organic materials

For the prevention of the oxidative degeneration and discoloration of pharmaceuticals, wearing apparel, films, and plastics.

(v) Rust-proofing of metals

For rust-proofing of metallic products such as iron, zinc, copper and aluminum products, and electric appliances, component parts, househould appliances, musical instruments and precision machines using these metals.

(vi) Detection of oxygen

A base material for an oxygen leakage detector.

The heat-generating compositions of this invention are capable of performing controlled heat generation as stated hereinabove. Accordingly, they can be used at relatively low temperatures in contact with a part of the human body for the warming and cold-proofing of the human body. Furthermore, they can be used at relatively high temperatures to warm coffee, milk, etc. Thus, they are expected to find a very wide range of application. Particularly, the following applications are recommended.

(vii) Utilization as a heater

Body warming materials such as a portable abdomen-warming heater; therapeutic materials such as warm pack; heating or warming of drinks such as liquors, coffee and milk; heating of packed foods such as canned foods; thawing of frozen foods; heat-diffusion of perfumes, moth-proofing agents, insecticides, and fungicides; cold-proofing materials; heat insulation; antifreezing agents for mats and windowpanes; portable heaters.

The following Examples illustrate the present invention in more detail.

EXAMPLE A

Commercially available sodium sulfide or potassium sulfide, as an anhydride or hydrate, and each of various components (B) and/or fillers (D) shown in Table 1 were mixed by an agate mortar in an atmosphere of nitrogen. The mixtures obtained were very pale green. When these mixtures were each exposed to an oxygen atmosphere at 20° C. and 1 atm., they absorbed oxygen in the amounts and for the periods of time indicated in Table 1.

TABLE 1

| Run No. | Alkali metal sulfide (a) (g) | Oxidation promotor (b) (g) | Filler (d) (g) | Exposure time (hours) | Amount of oxygen absorbed (cc) | Remarks |
|---|---|---|---|---|---|---|
| A-1 | $Na_2S \cdot 9H_2O$ (0.4) | diatomaceous earth (1) | — | 20 | 32 | Changed to very pale brown |
| A-2 | $Na_2S \cdot 9H_2O$ (0.4) | diatomaceous earth (0.5) | — | 20 | 31 | Changed to very pale brown |
| A-3 | $Na_2S \cdot 9H_2O$ (0.4) | diatomaceous earth (0.25) | — | 22 | 29 | |
| A-4 | $Na_2S \cdot 9H_2O$ (0.4) | diatomaceous earth (1.0) | MgO (fired at 300° C. (1.0) for 3 hrs) | 20 | 23 | |
| A-5 | $Na_2S \cdot 9H_2O$ (0.4) | diatomaceous earth (1.0) | active carbon (1.0) | 1/12 | 28 | |
| A-6 | $Na_2S \cdot 9H_2O$ (0.4) | diatomaceous earth (1.0) / active alumina (1.0) | — | 1/12 | 27 | |
| A-7 | $Na_2S \cdot 9H_2O$ (0.4) | active alumina (1) | — | 20 | 10 | |
| A-8 | $Na_2S \cdot 9H_2O$ (0.4) | silica (1) | — | 21 | 14 | |
| A-9 | $Na_2S \cdot 9H_2O$ (0.4) | $SiO_2 \cdot Al_2O_3$ (10:90) (1) | — | 22 | 25 | |
| A-10 | $Na_2S \cdot 9H_2O$ (0.4) | $SiO_2 \cdot Al_2O_3$ (30:70) (1) | — | 22 | 31 | |
| A-11 | $Na_2S \cdot 9H_2O$ (0.4) | $SiO_2 \cdot Al_2O_3$ (90:10) (1) | — | 21 | 27 | |
| A-12 | $Na_2S \cdot 9H_2O$ (0.4) | active alumina (0.5) | MgO (0.5) | 19 | 11 | |
| A-13 | $Na_2S \cdot 9H_2O$ (0.4) | silicagel (0.5) | MgO (0.5) | 19 | 32 | |
| A-14 | $Na_2S \cdot 9H_2O$ (0.4) | $SiO_2 \cdot Al_2O_3$ (50:50) (0.5) | active carbon (0.5) | 5 | 24 | Heat generated |
| A-15 | $Na_2S \cdot 9H_2O$ (0.4) | bentonite (0.5) / $SiO_2 \cdot Al_2O_3$ (50:50) (0.5) | — | 19 | 34 | |
| A-16 | $Na_2S \cdot 9H_2O$ (0.4) | bentonite (0.5) / $SiO_2 \cdot Al_2O_3$ (50:50) (0.5) | MgO (0.5) | 10 | 25 | |
| A-17 | $K_2S \cdot 5H_2O$ (0.4) | bentonite (1.0) / $SiO_2 \cdot Al_2O_3$ (50:50) (1.0) | — | 19 | 53 | Heat generated |
| A-18 | $K_2S \cdot 5H_2O$ (0.4) | diatomaceous earth (1.0) | — | 19 | 48 | Heat generated |
| A-19 | $K_2S \cdot 5H_2O$ (0.4) | zeolite H-type (1.0) | — | 19 | 55 | Changed from white to pale green |
| A-20 | $K_2S \cdot 5H_2O$ (0.4) | bentonite (1.0) | — | 19 | 52 | Heat generated |
| A-21 | $K_2S \cdot 5H_2O$ (0.4) | celite (1.0) | — | 19 | 61 | Heat generated (changed from pink to green) |
| A-22 | $K_2S$ (0.4) | diatomaceous earth (1.0) | $Na_2SO_4 \cdot 10H_2O$ (1.0) | 19 | 19 | Changed from green to yellowish green |
| A-23 | $K_2S \cdot 5H_2O$ (0.4) | $SiO_2 \cdot Al_2O_3$ (50:50) (0.5) / diatomaceous earth (0.5) | — | 19 | 50 | Heat generated |
| A-24 | $Na_2S \cdot 9H_2O$ (0.4) | acid terra alba (1.0) | — | 19 | 35 | |
| A-25 | $Na_2S \cdot 9H_2O$ (0.4) | wollastonite (1.0) | — | 19 | 13 | |
| A-26 | $Na_2S \cdot 9H_2O$ (0.4) | bentonite (0.5) | active carbon (0.5) | 23 | 26 | |
| A-27 | $Na_2S \cdot 9H_2O$ (0.4) | bentonite (0.5) / active alumina (0.5) | — | 23 | 31 | |
| A-28 | $Na_2S \cdot 9H_2O$ (0.4) | Molecular sieve 5A (1.0) | — | 18 | 38 | |
| A-29 | $K_2S$ (0.4) | Molecular sieve 4A (0.4) | — | 14 | 17 | |
| A-30 | $Na_2S \cdot 9H_2O$ (0.4) | celite (0.5) / Molecular sieve 4A (0.5) | — | 20 | 35 | |
| A-31 | $Na_2S \cdot 9H_2O$ (0.4) | celite (0.5) / silicagel (0.5) | — | 20 | 31 | |
| A-32 | $Na_2S \cdot 9H_2O$ (0.4) | bentonite (0.5) | — | 18 | 34 | Changed from pale earthlike color to blackish green |
| A-33 | $Na_2S \cdot 9H_2O$ (0.4) | bentonite (0.5) | MgO (0.5) | 23 | 26 | |
| A-34 | $Na_2S \cdot 9H_2O$ (0.4) | bentonite (0.5) | CaO (0.5) | 23 | 28 | Changed |

TABLE 1-continued

| Run No. | Alkali metal sulfide (a) (g) | Oxidation promotor (b) (g) | Filler (d) (g) | Exposure time (hours) | Amount of oxygen absorbed (cc) | Remarks |
|---|---|---|---|---|---|---|
| A-35 | Na$_2$S . 9H$_2$O (0.4) | bentonite (0.5) | poly-m-phenylene-isophthalamide fiber (0.5) | 23 | 23 | from earthlike color to green Changed from white to pale green |
| A-36 | Na$_2$S (0.4) | diatomaceous earth (0.5) | Na$_2$SO$_4$ . 10H$_2$O (1.0) | 17 | 117 | Heat generated (changed from pale green to black) |
| A-37 | Na$_2$S . 9H$_2$O (0.4) | — | — | 20 | 0 | Comparison |
| A-38 | — | active alumina (1.0) | — | 20 | 0 | " |
| A-39 | — | diatomaceous earth (1.0) | — | 20 | 0 | " |
| A-40 | Na$_2$S . 9H$_2$O (0.4) | — | active carbon (1.0) | 25 | 10 | " |
| A-41 | Na$_2$S . 9H$_2$O (0.4) | — | ZnO (1.0) | 20 | 2 | " |
| A-42 | K$_2$S . 5H$_2$O (0.4) | — | ZnO (1.0) | 20 | 7 | " |
| A-43 | Na$_2$S . 5H$_2$O (0.4) | — | CaO (1.0) | 20 | 5 | " |
| A-44 | Na$_2$S . 5H$_2$O (0.4) | — | MgO (1.0) | 20 | 8 | " |

EXAMPLE B

Each of the alkali metal sulfides (A), silica-magnesia (B) and each of the fillers (D) shown in Table 2 were mixed and pulverized by an agate mortar in an atmosphere of nitrogen. The mixtures obtained were each exposed to oxygen at 20° C. and 1 atmosphere. The results obtained are shown in Table 2.

EXAMPLE C

The alkali metal sulfides (A), the oxidation promoters (B) and the oxidation promoter acids (C) shown in Table 3 where each mixed in an agate mortar in an atmosphere of nitrogen. The mixtures were each exposed to an oxygen atmosphere at 25° C. and 1 atmosphere. In each case, oxygen absorption and heat gener-

TABLE 2

| Run No. | Alkali metal sulfide (a) (g) | Silica-magnesia (b) (g) | Filler (d) (g) | Exposure time (hours) | Amount of oxygen absorbed (cc) | Remarks |
|---|---|---|---|---|---|---|
| B-1 | K$_2$S . 5H$_2$O (0.4) | SiO$_2$ . MgO (50:50)(1.0) | — | 19 | 48 | Heat generated (changed from earthlike color to pale green) |
| B-2 | K$_2$S . 5H$_2$O (0.4) | talc (1.0) | — | 19 | 73 | Heat generated (changed from white to pale green) |
| B-3 | K$_2$S . 5H$_2$O (0.4) | SiO$_2$ . MgO (50:50) (0.5) | active carbon (0.5) | 18 | 29 | |
| B-4 | Na$_2$S . 9H$_2$O (0.4) | SiO$_2$ . MgO (50:50) (0.5) | — | 20 | 27 | Changed from white to grey |
| B-5 | Na$_2$S . 9H$_2$O (0.4) | SiO$_2$ . MgO (50:50) (0.2) | — | 20 | 16 | Changed from white to grey |
| B-6 | Na$_2$S . 9H$_2$O (0.4) | SiO$_2$ . MgO (50:50) (0.5) | active carbon (0.5) | 20 | 32 | Heat generated |
| B-7 | Na$_2$S . 9H$_2$O (0.4) | SiO$_2$ . MgO (50:50) (0.5) active alumina (0.5) | — | 20 | 24 | Changed from white to pale green |
| B-8 | Na$_2$S . 9H$_2$O (0.4) | SiO$_2$ . MgO (50:50) (0.5) | MgO (0.5) | 20 | 16 | |
| B-9 | Na$_2$S . 9H$_2$O (0.4) | SiO$_2$ . MgO (50:50) (0.5) Molecular sieve 4A (0.5) | — | 20 | 36 | Changed from pale green to bluish green |
| B-10 | Na$_2$S . 9H$_2$O (0.4) | SiO$_2$ . MgO (50:50) (0.5) SiO$_2$ . Al$_2$O$_3$ (50:50) (0.5) | — | 15 | 33 | |
| B-11 | Na$_2$S . 9H$_2$O (0.4) | SiO$_2$ . MgO (2.0) | — | 18 | 35 | |
| B-12 | Na$_2$S . 9H$_2$O (0.4) | India mica (1.0) | — | 19 | 25 | Changed from earthlike color to deep earthlike color |
| B-13 | Na$_2$S . 2.7H$_2$O (0.4) | SiO$_2$ . MgO (75:25) (0.5) | — | 1/6 | 62 | Heat generated |
| B-14 | Na$_2$S . 2.7H$_2$O (0.4) | SiO$_2$ . MgO (55:45) (0.5) | — | 1/6 | 72 | " | ation were observed. The results are also given in Table 3.

TABLE 3

| Run No. | Alkali metal sulfide (a) (g) | Oxidation promoter (b) (g) | Oxidation promoter aid (c) (mg) | Exposure time (hours) | Amount of oxygen absorbed (cc) | Remarks |
| --- | --- | --- | --- | --- | --- | --- |
| C-1 | $Na_2S \cdot 9H_2O$ (1.0) | diatomaceous earth (1.0) | CoO (32) | 1 | 98 | Heat generated |
| C-2 | $Na_2S \cdot 9H_2O$ (1.0) | diatomaceous earth (1.0) | CoO (156) | 1 | 104 | Heat generated |
| C-3 | $Na_2S \cdot 9H_2O$ (1.0) | $SiO_2 \cdot Al_2O_3$ (50:50) (1.0) | CoO (156) | 1/6 | 78 | Heat generated |
| C-4 | $Na_2S \cdot 9H_2O$ (1.0) | $SiO_2 \cdot MgO$ (50:50) (1.0) | CoO (156) | 1/2 | 88 | Heat generated |
| C-5 | $Na_2S \cdot 9H_2O$ (1.0) | $SiO_2 \cdot MgO$ (50:50) (1.0) | $Co(OCOCH_3)_2 \cdot 4H_2O$ (104) | 1/2 | 85 | Heat generated |
| C-6 | $Na_2S \cdot 9H_2O$ (1.0) | diatomaceous earth (1.0) | $Co(OCOCH_3)_2 \cdot 4H_2O$ (104) | 1/6 | 62 | Heat generated |
| C-7 | $Na_2S \cdot 9H_2O$ (1.0) | $SiO_2 \cdot Al_2O_3$ (50:50) (1.0) | $Co(OCOCH_3)_2 \cdot 4H_2O$ (104) | 1/12 | 82 | Heat generated |
| C-8 | $Na_2S \cdot 9H_2O$ (1.0) | $Al_2O_3$ (1.0) | $Co_2O_3$ (32) | 2 | 36 | Weak heat generation |
| C-9 | $Na_2S \cdot 9H_2O$ (1.0) | Talc (1.0) | $Co_2O_3$ (34) | 20 | 97 | |
| C-10 | $Na_2S \cdot 9H_2O$ (1.0) | Talc (1.0) | CoO (156) | 20 | 126 | Weak heat generation |
| C-11 | $Na_2S \cdot 5H_2O$ (0.5) | $SiO_2 \cdot Al_2O_3$ (50:50) (1.0) | CoO (112) | 1/6 | 53 | Heat generated |
| C-12 | $Na_2S \cdot 5H_2O$ (0.5) | $SiO_2 \cdot Al_2O_3$ (50:50) (1.0) | $Co(OCOC_6H_5)_2$ (90) | 1/12 | 44 | Heat generated |
| C-13 | $Na_2S \cdot 5H_2O$ (0.5) | $SiO_2 \cdot Al_2O_3$ (50:50) (1.0) | cobalt stearate (500) | 1/6 | 53 | Heat generated |
| C-14 | $Na_2S \cdot 5H_2O$ (0.4) | $SiO_2 \cdot MgO$ (58:42) (0.5) | Co (metal) (14.1) | 1/12 | 31 | Heat generated |
| C-15 | $Na_2S \cdot 5H_2O$ (0.5) | $SiO_2 \cdot Al_2O_3$ (50:50) (1.0) | $CoCl_2$ (27) | 1/12 | 39 | Heat generated |
| C-16 | $Na_2S \cdot 5H_2O$ (0.5) | $SiO_2 \cdot Al_2O_3$ (50:50) (1.0) | $CoCl_2 \cdot 6H_2O$ (50) | 1/12 | 37 | Heat generated |
| C-17 | $Na_2S \cdot 5H_2O$ (0.5) | $SiO_2 \cdot Al_2O_3$ (50:50) (1.0) | $CoSO_4 \cdot 7H_2O$ (84) | 1/12 | 38 | Heat generated |
| C-18 | $Na_2S \cdot 5H_2O$ (0.5) | $SiO_2 \cdot MgO$ (50:50) (1.0) | CoO (22) | 1/6 | 50 | Heat generated |
| C-19 | $Na_2S \cdot 5H_2O$ (0.5) | $SiO_2 \cdot MgO$ (50:50) (1.0) | $CoCl_2 \cdot 6H_2O$ (71) | 1/6 | 43 | Heat generated |
| C-20 | $Na_2S \cdot 5H_2O$ (0.5) | $SiO_2 \cdot MgO$ (50:50) (1.0) | $Co(OCOCH_3)_2 \cdot 4H_2O$ (74) | 1/12 | 39 | Heat generated |
| C-21 | $Na_2S \cdot 5H_2O$ (0.5) | $SiO_2 \cdot MgO$ (50:50) (1.0) | $Co(OCOC_6H_5)_2$ (90) | 1/12 | 47 | Heat generated |
| C-22 | $K_2S \cdot 5H_2O$ (0.5) | $SiO_2 \cdot Al_2O_3$ (0.5) | CoO (22) | 1/12 | 46 | Heat generated |
| C-23 | $Na_2S \cdot 9H_2O$ (1.0) | diatomaceous earth (1.0) | $MnO_2$ (181) | 1/12 | 75 | Heat generated |
| C-24 | $Na_2S \cdot 9H_2O$ (1.0) | $SiO_2 \cdot Al_2O_3$ (50:50) (1.0) | $MnO_2$ (181) | 1/12 | 57 | Heat generated |
| C-25 | $Na_2S \cdot 9H_2O$ (1.0) | $SiO_2 \cdot MgO$ (50:50) (1.0) | $MnO_2$ (181) | 1/2 | 66 | Heat generated |
| C-26 | $Na_2S \cdot 9H_2O$ (1.0) | $SiO_2 \cdot MgO$ (50:50) (1.0) | $Mn(OCOCH_3)_2 \cdot 4H_2O$ (102) | 1/2 | 83 | Heat generated |
| C-27 | $Na_2S \cdot 9H_2O$ (1.0) | diatomaceous earth (1.0) | $Mn(OCOCH_3)_2 \cdot 4H_2O$ (102) | 1/2 | 92 | Heat generated |
| C-28 | $Na_2S \cdot 9H_2O$ (1.0) | $SiO_2 \cdot Al_2O_3$ (1.0) | $Mn(OCOCH_3)_2 \cdot 4H_2O$ (102) | 1/6 | 66 | Heat generated |
| C-29 | $Na_2S \cdot 9H_2O$ (1.0) | $Al_2O_3$ (1.0) | $MnO_2$ (37) | 1/12 | 34 | Heat generated |
| C-30 | $Na_2S \cdot 9H_2O$ (1.0) | silicagel (1.0) | $MnO_2$ (37) | 1/2 | 40 | Heat generated |
| C-31 | $Na_2S \cdot 9H_2O$ (1.0) | talc (1.0) | $MnO_2$ (37) | 1 | 72 | Heat generated |
| C-32 | $Na_2S \cdot 9H_2O$ (1.0) | acid terra alba (1.0) | $MnO_2$ (37) | 1 | 59 | Heat generated |
| C-33 | $Na_2S \cdot 5H_2O$ (0.5) | $SiO_2 \cdot Al_2O_3$ (1.0) | $Mn(OCOC_6H_5)_2$ (88) | 1/12 | 51 | Heat generated |
| C-34 | $Na_2S \cdot 5H_2O$ (0.5) | $SiO_2 \cdot Al_2O_3$ (1.0) | $MnO_2$ (100) | 1/12 | 53 | Heat generated |
| C-35 | $Na_2S \cdot 5H_2O$ (0.5) | $SiO_2 \cdot Al_2O_3$ (1.0) | $MnCl_2 \cdot 4H_2O$ (59) | 1/12 | 46 | Heat generated |
| C-36 | $Na_2S \cdot 5H_2O$ (0.5) | $SiO_2 \cdot MgO$ (50:50) (1.0) | $Mn(OCOC_6H_5)_2$ (88) | 1/12 | 51 | Heat generated |
| C-37 | $K_2S$ (0.5) | diatomaceous earth (0.5) | $MnO_2$ (40) | 20 | 36 | Heat generated |
| C-38 | $Na_2S \cdot 5H_2O$ (0.4) | $SiO_2 \cdot MgO$ (58:42) (0.4) | Mn (metal) (13.2) | 1/12 | 37 | Heat |

TABLE 3-continued

| Run No. | Alkali metal sulfide (a) (g) | Oxidation promoter (b) (g) | Oxidation promoter aid (c) (mg) | Exposure time (hours) | Amount of oxygen absorbed (cc) | Remarks |
|---|---|---|---|---|---|---|
| C-39 | Na$_2$S . 9H$_2$O (1.0) | SiO$_2$ . Al$_2$O$_3$ (50:50) (1.0) | NiO (94) | 1/6 | 86 | Heat generated |
| C-40 | Na$_2$S . 9H$_2$O (1.0) | SiO$_2$ . Al$_2$O$_3$ (50:50) (1.0) | NiO (156) | 1/6 | 95 | Heat generated |
| C-41 | Na$_2$S . 9H$_2$O (1.0) | SiO$_2$ . MgO (50:50) (1.0) | NiO (156) | 1/2 | 74 | Heat generated |
| C-42 | Na$_2$S . 9H$_2$O (1.0) | SiO$_2$ . MgO (50:50) (1.0) | Ni(OCOCH$_3$)$_2$ . 4H$_2$O (104) | 1/2 | 85 | Heat generated |
| C-43 | Na$_2$S . 9H$_2$O (1.0) | diatomaceous earth (1.0) | Ni(OCOCH$_3$)$_2$ . 4H$_2$O (104) | 1/6 | 94 | Heat generated |
| C-44 | Na$_2$S . 9H$_2$O (1.0) | talc (1.0) | Ni(OCOCH$_3$)$_2$ . 4H$_2$O (104) | 1 | 80 | Heat generated |
| C-45 | Na$_2$S . 5H$_2$O (0.5) | SiO$_2$ . Al$_2$O$_3$ (50:50) (1.0) | NiO (22) | 1/6 | 56 | Heat generated |
| C-46 | Na$_2$S . 5H$_2$O (0.5) | SiO$_2$ . Al$_2$O$_3$ (50:50) (1.0) | NiO (223) | 1/6 | 53 | Heat generated |
| C-47 | Na$_2$S . 5H$_2$O (0.5) | SiO$_2$ . Al$_2$O$_3$ (50:50) (1.0) | Ni(OCOCH$_3$)$_2$ . 4H$_2$O (74) | 1/6 | 43 | Heat generated |
| C-48 | Na$_2$S . 5H$_2$O (0.5) | SiO$_2$ . Al$_2$O$_3$ (50:50) (1.0) | NiCl$_2$ (39) | 1/12 | 40 | Heat generated |
| C-49 | Na$_2$S . 5H$_2$O (0.5) | SiO$_2$ . Al$_2$O$_3$ (50:50) (1.0) | Ni(NO$_3$)$_2$ . 6H$_2$O (78) | 1/12 | 39 | Heat generated |
| C-50 | Na$_2$S . 5H$_2$O (0.5) | SiO$_2$ . MgO (50:50) (1.0) | NiO (22) | 1/2 | 50 | Heat generated |
| C-51 | Na$_2$S . 5H$_2$O (0.5) | SiO$_2$ . MgO (50:50) (1.0) | NiO (223) | 1/6 | 56 | Heat generated |
| C-52 | Na$_2$S . 5H$_2$O (0.5) | SiO$_2$ . MgO (50:50) (1.0) | NiSO$_4$ . 6H$_2$O (78) | 1/12 | 46 | Heat generated |
| C-53 | Na$_2$S . 5H$_2$O (0.5) | SiO$_2$ . MgO (50:50) (1.0) | Ni(OCOCH$_3$)$_2$ . 4H$_2$O (74) | 1/12 | 52 | Heat generated |
| C-54 | K$_2$S . 5H$_2$O (0.5) | SiO$_2$ . Al$_2$O$_3$ (50:50) (0.5) | NiO (23) | 1/12 | 54 | Heat generated |
| C-55 | Na$_2$S . 5H$_2$O (0.4) | SiO$_2$ . MgO (58:42) (0.5) | Ni (metal) (14.1) | 1/12 | 35 | Heat generated |
| C-56 | Na$_2$S . 9H$_2$O (1.0) | diatomaceous earth (1.0) | Fe$_2$O$_3$ (167) | 1 | 120 | Heat generated |
| C-57 | Na$_2$S . 9H$_2$O (1.0) | SiO$_2$ . Al$_2$O$_3$ (50:50) (1.0) | Fe$_2$O$_3$ (167) | 1/2 | 87 | Heat generated |
| C-58 | Na$_2$S . 9H$_2$O (1.0) | SiO$_2$ . Al$_2$O$_3$ (50:50) (1.0) | Fe(OCOCH$_3$)$_3$ . 4H$_2$O (127) | 1/6 | 53 | Heat generated |
| C-59 | Na$_2$S . 9H$_2$O (1.0) | silicagel (1.0) | Fe$_2$O$_3$ (34) | 20 | 81 | |
| C-60 | Na$_2$S . 9H$_2$O (1.0) | acid terra alba (1.0) | Fe$_2$O$_3$ (34) | 1 | 58 | Heat generated |
| C-61 | Na$_2$S . 5H$_2$O (0.5) | SiO$_2$ . Al$_2$O$_3$ (50:50) (1.0) | FeCl$_3$ (48) | 1/12 | 39 | Heat generated |
| C-62 | Na$_2$S . 5H$_2$O (0.5) | SiO$_2$ . Al$_2$O$_3$ (50:50) (1.0) | Fe(NO$_3$)$_3$ . 9H$_2$O (122) | 1/12 | 36 | Heat generated |
| C-63 | Na$_2$S . 5H$_2$O (1.0) | SiO$_2$ . MgO (1.0) | Fe$_2$O$_3$ (24) | 1/12 | 46 | Heat generated |
| C-64 | Na$_2$S . 9H$_2$O (1.0) | diatomaceous earth (1.0) | CuO (33) | 1 | 93 | Heat generated |
| C-65 | Na$_2$S . 9H$_2$O (1.0) | SiO$_2$ . Al$_2$O$_3$ (50:50) (1.0) | CuO (33) | 1/12 | 72 | Heat generated |
| C-66 | Na$_2$S . 9H$_2$O (1.0) | SiO$_2$ . MgO (50:50) (1.0) | CuO (33) | 1/2 | 66 | Heat generated |
| C-67 | Na$_2$S . 9H$_2$O (1.0) | SiO$_2$ . Al$_2$O$_3$ (50:50) (1.0) | Cu(OCOCH$_3$)$_2$ . 2H$_2$O (83) | 1 | 59 | Weak heat generation |
| C-68 | Na$_2$S . 9H$_2$O (1.0) | SiO$_2$ . MgO (50:50) (1.0) | Cu(OCOCH$_3$)$_2$ . 2H$_2$O (83) | 1/6 | 72 | heat generated |
| C-69 | Na$_2$S . 5H$_2$O (0.5) | SiO$_2$ . Al$_2$O$_3$ (50:50) (1.0) | CuSO$_4$ . 5H$_2$O (74) | 1/12 | 47 | heat generated |
| C-70 | Na$_2$S . 5H$_2$O (0.5) | SiO$_2$ . Al$_2$O$_3$ (50:50) (1.0) | CuCl$_2$ . 2H$_2$O (51) | 1/12 | 47 | heat generated |
| C-71 | Na$_2$S . 5H$_2$O (0.5) | SiO$_2$ . MgO (50:50) (1.0) | CuO (24) | 1/12 | 41 | heat generated |
| C-72 | Na$_2$S . 5H$_2$O (0.5) | SiO$_2$ . MgO (50:50) (1.0) | CuSO$_4$ . 5H$_2$O (74) | 1/12 | 41 | heat generated |
| C-73 | Na$_2$S . 5H$_2$O (0.4) | SiO$_2$ . MgO (58:42) (0.5) | Cu (metal) (15.2) | 1/12 | 42 | heat generated |
| C-74 | Na$_2$S . 5H$_2$O (0.5) | SiO$_2$ . Al$_2$O$_3$ (50:50) (0.5) | Ce(CO$_3$)$_3$ . 5H$_2$O (81.9) | 1/12 | 45 | |
| C-75 | Na$_2$S . 5H$_2$O (0.5) | SiO$_2$ . MgO (50:50) (0.5) | Ce(CO$_3$)$_3$ . 5H$_2$O (245.7) | 1/12 | 48 | |
| C-76 | Na$_2$S . 5H$_2$O (0.5) | SiO$_2$ . Al$_2$O$_3$ (50:50) (0.5) | CeCl$_3$ . 7H$_2$O (221.8) | 1/12 | 46 | |
| C-77 | Na$_2$S . 5H$_2$O (0.5) | SiO$_2$ . Al$_2$O$_3$ (50:50) (0.5) | Ce(OH)$_3$ (113.8) | 1/12 | 37 | |
| C-78 | Na$_2$S . 5H$_2$O (0.5) | SiO$_2$ . Al$_2$O$_3$ (50:50) (0.5) | Ce(OH)$_4$ (124.0) | 1/12 | 37 | |
| C-79 | Na$_2$S . 5H$_2$O (0.5) | SiO$_2$ . Al$_2$O$_3$ (50:50) (0.5) | Ce(SO$_4$)$_2$ . 2(NH$_4$)$_2$ . SO$_4$ . 4H$_2$O (298.5) | 1/12 | 36 | |

TABLE 3-continued

| Run No. | Alkali metal sulfide (a) (g) | Oxidation promoter (b) (g) | Oxidation promoter aid (c) (mg) | Exposure time (hours) | Amount of oxygen absorbed (cc) | Remarks |
|---|---|---|---|---|---|---|
| C-80 | Na$_2$S . 5H$_2$O (0.5) | SiO$_2$ . Al$_2$O$_3$ (50:50) (0.5) | cerium acetylacetonate (130.2) | 1/12 | 36 | |
| C-81 | Na$_2$S . 5H$_2$O (0.5) | SiO$_2$ . MgO (0.5) | Ce(SO$_4$)$_2$ . 2(NH$_4$)$_2$ . SO$_4$ . 4H$_2$O (298.5) | 1/12 | 15 | |
| C-82 | Na$_2$S . 5H$_2$O (0.5) | SiO$_2$ . MgO (0.5) | Ce(NO$_3$)$_3$ . 6H$_2$O (258.4) | 1/2 | 42 | |
| C-83 | Na$_2$S . 5H$_2$O (0.5) | SiO$_2$ . MgO (0.5) | cerium acetylacetonate (130.2) | 1/12 | 36 | |
| C-84 | Na$_2$S . 5H$_2$O (0.5) | SiO$_2$ . MgO (0.5) | cerium acetylacetonate (390.6) | 1/12 | 44 | |
| C-85 | Na$_2$S . 5H$_2$O (0.5) | acid terra alba (0.5) | Ce(CO$_3$)$_3$ . 5H$_2$O (82) | 1/2 | 29 | |
| C-86 | Na$_2$S . 5H$_2$O (0.5) | acid terra alba (0.5) | CeCl$_3$ . 6H$_2$O (221.8) | 1/2 | 21 | |
| C-87 | Na$_2$S . 5H$_2$O (0.5) | kaolin (0.5) | Ce(CO$_3$)$_3$ . 5H$_2$O (82) | 1 | 30 | |
| C-88 | Na$_2$S . 5H$_2$O (0.5) | Molecular sieve 4A (0.5) | Ce(CO$_3$)$_3$ . 5H$_2$O (250) | 1/12 | 36 | |
| C-89 | Na$_2$S . 5H$_2$O (0.5) | SiO$_2$ . Al$_2$O$_3$ (50:50) (0.5) | PbO$_2$ (0.7) | 1/6 | 31 | Weak heat generation |
| C-90 | Na$_2$S . 5H$_2$O (0.5) | SiO$_2$ . Al$_2$O$_3$ (50:50) (0.5) | PbO$_2$ (7.1) | 1/12 | 22 | Weak heat generation |
| C-91 | Na$_2$S . 5H$_2$O (0.5) | SiO$_2$ . Al$_2$O$_3$ (50:50) (0.5) | PbO$_2$ (71.2) | 1/12 | 44 | Heat generated |
| C-92 | Na$_2$S . 5H$_2$O (0.5) | SiO$_2$ . Al$_2$O$_3$ (50:50) (0.5) | Pb$_3$O$_4$ (68.0) | 1/12 | 40 | Heat generated |
| C-93 | Na$_2$S . 5H$_2$O (0.5) | SiO$_2$ . Al$_2$O$_3$ (50:50) (0.5) | lead acetate (112.9) | 1/12 | 42 | Heat generated |
| C-94 | Na$_2$S . 5H$_2$O (0.5) | SiO$_2$ . Al$_2$O$_3$ (50:50) (0.5) | lead sulfate (90.3) | 1/12 | 47 | Heat generated |
| C-95 | Na$_2$S . 5H$_2$O (0.5) | SiO$_2$ . MgO (50:50) (0.5) | PbO$_2$ (71.2) | 1/12 | 35 | Heat generated |
| C-96 | Na$_2$S . 5H$_2$O (0.5) | SiO$_2$ . MgO (50:50) (0.5) | lead acetate (112.9) | 1/12 | 19 | Heat generated |
| C-97 | Na$_2$S . 5H$_2$O (0.5) | SiO$_2$ . MgO (50:50) (0.5) | lead sulfate (90.3) | 1/12 | 20 | Heat generated |
| C-98 | Na$_2$S . 9H$_2$O (0.5) | SiO$_2$ . Al$_2$O$_3$ (50:50) (0.5) | PbO$_2$ (71) | 1/12 | 34 | Heat generated |
| C-99 | Na$_2$S . 9H$_2$O (0.5) | SiO$_2$ . Al$_2$O$_3$ (50:50) (0.5) | lead sulfate (100) | 1/12 | 35 | Heat generated |
| C-100 | Na$_2$S . 9H$_2$O (0.5) | diatomaceous earth (0.5) | PbO$_2$ (71) | 1/12 | 32 | Heat generated |
| C-101 | Na$_2$S . 9H$_2$O (0.5) | diatomaceous earth (0.5) | lead sulfate (100) | 1/3 | 43 | Heat generated |
| C-102 | Na$_2$S . 9H$_2$O (0.5) | acid terra alba (0.5) | PbO$_2$ (71) | 1 | 29 | Weak heat generation |
| C-103 | Na$_2$S . 9H$_2$O (0.5) | SiO$_2$ . MgO (50:50) (0.5) | PbO$_2$ (71) | 1/6 | 28 | Heat generated |
| C-104 | Na$_2$S . 9H$_2$O (0.5) | talc (0.5) | PbO$_2$ (71) | 1 | 27 | Weak heat generation |
| C-105 | Na$_2$S . 9H$_2$O (0.5) | active alumina (0.5) | PbO$_2$ (21) | 1/2 | 14 | Weak heat generation |
| C-106 | Na$_2$S . 5H$_2$O (0.5) | SiO$_2$ . Al$_2$O$_3$ (30:70) (0.5) | lead sulfate (90) | 1/6 | 36 | Heat generated |
| C-107 | Na$_2$S . 5H$_2$O (0.5) | SiO$_2$ . Al$_2$O$_3$ (70:30) (0.5) | lead sulfate (90) | 1/6 | 42 | Heat generated |
| C-108 | Na$_2$S . 5H$_2$O (0.5) | diatomaceous earth (0.5) | PbO$_2$ (71) | 1/6 | 34 | Heat generated |
| C-109 | Na$_2$S . 5H$_2$O (0.5) | diatomaceous earth (0.5) | lead sulfate (100) | 1/3 | 43 | Heat generated |
| C-110 | Na$_2$S . 5H$_2$O (0.5) | Molecular sieve 4A (0.5) | lead sulfate (100) | 1/6 | 42 | Heat generated |
| C-111 | Na$_2$S . 5H$_2$O (0.5) | diatomaceous earth (0.5) | SeO$_2$ (33) | 1/12 | 45 | Heat generated |
| C-112 | Na$_2$S . 5H$_2$O (0.5) | SiO$_2$ . Al$_2$O$_3$ (50:50) (0.5) | SeO$_2$ (3.3) | 1/12 | 47 | Heat generated |
| C-113 | Na$_2$S . 5H$_2$O (0.5) | SiO$_2$ . Al$_2$O$_3$ (50:50) (0.5) | SeO$_2$ (33) | 1/12 | 52 | Heat generated |
| C-114 | Na$_2$S . 5H$_2$O (0.5) | SiO$_2$ . Al$_2$O$_3$ (50:50) (0.5) | selenous acid (38.4) | 1/12 | 49 | Heat generated |
| C-115 | Na$_2$S . 5H$_2$O (0.5) | SiO$_2$ . Al$_2$O$_3$ (50:50) (0.5) | selenic acid (43.2) | 1/12 | 41 | Heat generated |
| C-116 | Na$_2$S . 5H$_2$O (0.5) | SiO$_2$ . MgO (50:50) (0.5) | SeO$_2$ (3.3) | 1/6 | 42 | Heat generated |
| C-117 | Na$_2$S . 5H$_2$O (0.5) | SiO$_2$ . MgO (50:50) (0.5) | SeO$_2$ (16.5) | 1/6 | 49 | Heat generated |
| C-118 | Na$_2$S . 5H$_2$O (0.5) | SiO$_2$ . MgO (50:50) (0.5) | SeO$_2$ (33) | 1/6 | 55 | Heat generated |
| C-119 | Na$_2$S . 5H$_2$O (0.5) | Molecular sieve 4A (0.5) | SeO$_2$ (33) | 1/12 | 46 | Heat generated |
| C-120 | Na$_2$S . 5H$_2$O (0.5) | Al$_2$O$_3$ (0.5) | SeO$_2$ (33) | 1/6 | 15 | Weak heat generation |

TABLE 3-continued

| Run No. | Alkali metal sulfide (a) (g) | Oxidation promoter (b) (g) | Oxidation promoter aid (c) (mg) | Exposure time (hours) | Amount of oxygen absorbed (cc) | Remarks |
|---|---|---|---|---|---|---|
| C-121 | $Na_2S \cdot 5H_2O$ (0.5) | acid terra alba (0.5) | $SeO_2$ (33) | 1/6 | 31 | Heat generated |
| C-122 | $Na_2S \cdot 5H_2O$ (0.5) | kaolin (0.5) | $SeO_2$ (33) | 1/6 | 30 | Heat generated |
| C-123 | $Na_2S \cdot 5H_2O$ (0.4) | $SiO_2 \cdot MgO$ (58:42) (0.5) | Se (metal) (19) | 1/12 | 41 | Heat generated |
| C-124 | $Na_2S \cdot 5H_2O$ (0.5) | $SiO_2 \cdot Al_2O_3$ (50:50) (0.5) | $PdO_2$ (20.5) | 1/12 | 26 | Heat generated |
| C-125 | $Na_2S \cdot 5H_2O$ (0.5) | $SiO_2 \cdot Al_2O_3$ (50:50) (0.5) | $PdO_2$ (82.6) | 1/12 | 36 | Heat generated |
| C-126 | $Na_2S \cdot 5H_2O$ (0.5) | $SiO_2 \cdot Al_2O_3$ (50:50) (0.5) | $Pd(NO_3)_2$ (68.6) | 1/12 | 25 | Heat generated |
| C-127 | $Na_2S \cdot 5H_2O$ (0.5) | $SiO_2 \cdot Al_2O_3$ (50:50) (0.5) | palladium acetylacetonate (101.3) | 1/12 | 21 | Heat generated |
| C-128 | $Na_2S \cdot 5H_2O$ (0.5) | $SiO_2 \cdot MgO$ (50:50) (0.5) | $PdO_2$ (41.3) | 1/6 | 41 | Heat generated |
| C-129 | $Na_2S \cdot 5H_2O$ (0.5) | $SiO_2 \cdot MgO$ (50:50) (0.5) | $PdO_2$ (165.2) | 1/12 | 42 | Heat generated |
| C-130 | $Na_2S \cdot 5H_2O$ (0.5) | $SiO_2 \cdot MgO$ (50:50) (0.5) | $PdCl_2$ (52.9) | 1/6 | 32 | Heat generated |
| C-131 | $Na_2S \cdot 5H_2O$ (0.5) | $SiO_2 \cdot MgO$ (50:50) (0.5) | palladium sulfate (71.0) | 1/6 | 25 | Heat generated |
| C-132 | $Na_2S \cdot 5H_2O$ (0.5) | diatomaceous earth (0.5) | $PdO_2$ (41.3) | 1 | 13.2 | |
| C-133 | $Na_2S \cdot 5H_2O$ (0.5) | Molecular sieve 4A (0.5) | $PdO_2$ (41.3) | 1/12 | 44 | Heat generated |
| C-134 | $Na_2S \cdot 9H_2O$ (0.5) | $SiO_2 \cdot MgO$ (50:50) (0.5) | $PdO_2$ (41.3) | 1/6 | 31 | Heat generated |
| C-135 | $Na_2S \cdot 5H_2O$ (0.4) | $SiO_2 \cdot MgO$ (58:42) (0.5) | Pd (metal) (25.5) | 1/12 | 26 | Heat generated |
| C-136 | $Na_2S \cdot 5H_2O$ (0.5) | $SiO_2 \cdot Al_2O_3$ (50:50) (0.5) | SnO (44.9) | 1/6 | 46 | Heat generated |
| C-137 | $Na_2S \cdot 9H_2O$ (0.5) | $SiO_2 \cdot Al_2O_3$ (50:50) (0.5) | $SnCl_2$ (94) | 1 | 15 | Weak heat generation |
| C-138 | $Na_2S \cdot 9H_2O$ (0.5) | $SiO_2 \cdot Al_2O_3$ (50:50) (0.5) | $SnCl_2$ (45) | 1/12 | 20 | Heat generated |
| C-139 | $Na_2S \cdot 9H_2O$ (0.5) | $SiO_2 \cdot Al_2O_3$ (50:50) (0.5) | $Sn_2(OCOCH_3)_4$ (79) | 1 | 21 | Weak heat generation |
| C-140 | $Na_2S \cdot 9H_2O$ (1.0) | $SiO_2 \cdot Al_2O_3$ (50:50) (1.0) | $Cr_2O_3$ (156) | ½ | 87 | Heat generated |
| C-141 | $Na_2S \cdot 9H_2O$ (1.0) | silicagel (1.0) | $Cr_2O_3$ (32) | 20 | 81 | |
| C-142 | $Na_2S \cdot 9H_2O$ (1.0) | acid terra alba (1.0) | $Cr_2O_3$ (32) | 1 | 57 | Heat generated |
| C-143 | $K_2S \cdot 5H_2O$ (0.5) | $SiO_2 \cdot Al_2O_3$ (50:50) (0.5) | $Cr_2O_3$ (31) | 1/12 | 36 | Heat generated |
| C-144 | $Na_2S \cdot 5H_2O$ (0.5) | diatomaceous earth (0.5) | $TeO_2$ (48) | 1 | 25 | Weak heat generation |
| C-145 | $Na_2S \cdot 5H_2O$ (0.5) | $SiO_2 \cdot Al_2O_3$ (50:50) (0.5) | $TeO_2$ (47.5) | 1/12 | 35 | Heat generated |
| C-146 | $Na_2S \cdot 5H_2O$ (0.5) | $SiO_2 \cdot Al_2O_3$ (50:50) (0.5) | $TeO_3$ (52.3) | 1/12 | 42 | Heat generated |
| C-147 | $Na_2S \cdot 5H_2O$ (0.5) | $SiO_2 \cdot Al_2O_3$ (50:50) (0.5) | tellurous acid (52.9) | 1/12 | 44 | Heat generated |
| C-148 | $Na_2S \cdot 5H_2O$ (0.5) | $SiO_2 \cdot Al_2O_3$ (50:50) (0.5) | telluric acid (68.4) | 1/12 | 43 | Heat generated |
| C-149 | $Na_2S \cdot 5H_2O$ (0.5) | $SiO_2 \cdot Al_2O_3$ (50:50) (0.5) | $TeCl_4$ (80.0) | 1/12 | 32 | Heat generated |
| C-150 | $Na_2S \cdot 5H_2O$ (0.5) | $SiO_2 \cdot Al_2O_3$ (50:50) (0.5) | $TeBr_4$ (133.1) | 1/12 | 29 | Heat generated |
| C-151 | $Na_2S \cdot 9H_2O$ (0.5) | $SiO_2 \cdot Al_2O_3$ (50:50) (0.5) | $TeCl_4$ (33) | 1/12 | 30 | Heat generated |
| C-152 | $Na_2S \cdot 9H_2O$ (0.5) | $SiO_2 \cdot Al_2O_3$ (50:50) (0.5) | $TeO_2$ (47.5) | 1/12 | 23 | Heat generated |
| C-153 | $Na_2S \cdot 5H_2O$ (0.5) | $Al_2O_3$ (0.5) | $TeO_2$ (47.5) | 1/6 | 15 | Weak heat generation |
| C-154 | $Na_2S \cdot 5H_2O$ (0.5) | $SiO_2 \cdot Al_2O_3$ (50:50) (0.5) | $Ir_2O_3$ (64) | 1/12 | 44 | Heat generated |
| C-155 | $Na_2S \cdot 5H_2O$ (0.5) | $SiO_2 \cdot Al_2O_3$ (50:50) (0.5) | $IrCl_3$ (88.9) | 1/12 | 34 | Heat generated |
| C-156 | $Na_2S \cdot 5H_2O$ (0.5) | $SiO_2 \cdot MgO$ (50:50) (0.5) | $Ir_2O_3$ (64) | 1/12 | 32 | Heat generated |
| C-157 | $Na_2S \cdot 5H_2O$ (0.5) | $SiO_2 \cdot MgO$ (50:50) (0.5) | $Ir_2O_3$ (128.7) | 1/12 | 40 | Heat generated |
| C-158 | $Na_2S \cdot 5H_2O$ (0.5) | Molecular sieve 4 A (0.5) | $Ir_2O_3$ (64) | 1/12 | 44 | Heat generated |
| C-159 | $Na_2S \cdot 9H_2O$ (0.5) | $SiO_2 \cdot Al_2O_3$ (50:50) (0.5) | $Ir_2O_3$ (64) | 1/12 | 38 | Heat generated |
| C-160 | $Na_2S \cdot 5H_2O$ (0.5) | $SiO_2 \cdot Al_2O_3$ (50:50) (0.5) | $PtO_2$ (67.6) | 1/12 | 41 | Heat |

TABLE 3-continued

| Run No. | Alkali metal sulfide (a) (g) | Oxidation promoter (b) (g) | Oxidation promoter aid (c) (mg) | Exposure time (hours) | Amount of oxygen absorbed (cc) | Remarks |
|---|---|---|---|---|---|---|
| C-161 | $Na_2S \cdot 5H_2O$ (0.5) | $SiO_2 \cdot MgO$ (50:50) (0.5) | $PtO_2$ (67.6) | 1/6 | 49 | Heat generated |
| C-162 | $Na_2S \cdot 5H_2O$ (0.5) | acid terra alba (0.5) | $PtO_2$ (67.6) | 1/6 | 10.1 | Weak heat generation |
| C-163 | $Na_2S \cdot 9H_2O$ (0.5) | $SiO_2 \cdot Al_2O_3$ (50:50) (0.5) | $PtO_2$ (67.6) | 1/12 | 22 | Heat generated |
| C-164 | $Na_2S \cdot 9H_2O$ (0.5) | $SiO_2 \cdot MgO$ (50:50) (0.5) | $PtO_2$ (67.6) | 1/6 | 30 | Heat generated |
| C-165 | $Na_2S \cdot 5H_2O$ (0.5) | $SiO_2 \cdot Al_2O_3$ (50:50) (0.5) | $Re_2O_7$ (72.1) | 1/12 | 40 | Heat generated |
| C-166 | $Na_2S \cdot 5H_2O$ (0.5) | $SiO_2 \cdot MgO$ (50:50) (0.5) | $Re_2O_7$ (72.1) | 1/12 | 28 | Heat generated |
| C-167 | $Na_2S \cdot 9H_2O$ (0.5) | $SiO_2 \cdot Al_2O_3$ (50:50) (0.5) | $Re_2O_7$ (72.1) | 1/12 | 31 | Heat generated |
| C-168 | $Na_2S \cdot 5H_2O$ (0.5) | $SiO_2 \cdot Al_2O_3$ (50:50) (0.5) | $RuO_2$ (39.6) | 1/12 | 33 | Heat generated |
| C-169 | $Na_2S \cdot 5H_2O$ (0.5) | $SiO_2 \cdot Al_2O_3$ (50:50) (0.5) | $RuCl_3 \cdot H_2O$ (68.3) | 1/12 | 41 | Heat generated |
| C-170 | $Na_2S \cdot 5H_2O$ (0.5) | $SiO_2 \cdot MgO$ (50:50) (0.5) | $RuO_2$ (39.6) | 1/6 | 38 | Heat generated |
| C-171 | $Na_2S \cdot 9H_2O$ (0.5) | $SiO_2 \cdot Al_2O_3$ (50:50) (0.5) | $RuO_2$ (38.6) | 1/12 | 25 | Heat generated |
| C-172 | $Na_2S \cdot 5H_2O$ (0.5) | $SiO_2 \cdot Al_2O_3$ (50:50) (0.5) | $Rh_2O_3$ (38) | 1/12 | 36 | Heat generated |
| C-173 | $Na_2S \cdot 5H_2O$ (0.5) | $SiO_2 \cdot Al_2O_3$ (50:50) (0.5) | $RhCl_3$ (78.4) | 1/12 | 29 | Heat generated |
| C-174 | $Na_2S \cdot 5H_2O$ (0.5) | $SiO_2 \cdot MgO$ (50:50) (0.5) | $Rh_2O_3$ (38) | 1/6 | 55 | Heat generated |
| C-175 | $Na_2S \cdot 9H_2O$ (0.5) | $SiO_2 \cdot Al_2O_3$ (50:50) (0.5) | $Rh_2O_3$ (38) | 1/12 | 20 | Heat generated |
| C-176 | $Na_2S \cdot 5H_2O$ (0.5) | $SiO_2 \cdot Al_2O_3$ (50:50) (0.5) | $OsO_4$ (75.6) | 1/12 | 40 | Heat generated |
| C-177 | $Na_2S \cdot 5H_2O$ (0.5) | $SiO_2 \cdot Al_2O_3$ (50:50) (0.5) | $OsCl_3$ (88.2) | 1/12 | 34 | Heat generated |
| C-178 | $Na_2S \cdot 9H_2O$ (0.5) | $SiO_2 \cdot Al_2O_3$ (50:50) (0.5) | $OsO_4$ (75.6) | 1/12 | 22 | Heat generated |

EXAMPLE D-1

$Na_2S \cdot 5H_2O$ (10.0 g), 10.0 g of silica-magnesia ($SiO_2$-MgO, 50:50) and 2.0 g of cobalt oxide (CoO) were mixed in an agate mortar in an atmosphere of nitrogen to prepare a heat-generating composition. Separately, a non-woven cloth of polypropylene was heat-treated to form an oxygen-permeable porous film (thickness 125 microns; oxygen permeability 3.3 $cc/cm^2 \cdot min \cdot O_2$ (1 atm.). A bag having a size of 6 cm × 9 cm was made one surface of which was composed of the porous film and the other surface of which was composed of an air-impermeable film. In an atmosphere of nitrogen, the heat-generating composition obtained was packed into this bag to form a sheet-like heat-generating structure. The resulting heat-generating structure was taken into the open air, and placed stationary on tissue paper having a thickness of about 5 mm on a wooden desk while the oxygen-permeable porous film side was on top. A thermometer was contacted closely with the undersurface of the heat-generating structure, and a rise in temperature was measured. While the room temperature was 26° C., the surface of the heat-generating structure attained a temperature of 78° C., and maintained a temperature of more than 70° C. for about 2 hours.

The oxygen permeability of the porous film is defined by the amount (cc) of oxygen which passes through the film per unit area (1 $cm^2$) per unit time (1 minute) per unit partial pressure different (1 atmosphere), and can be measured by using a simple device such as the one described below.

A receptacle provided into two sections A and B and maintained at atmospheric pressure is used, and the permeable film sample (having a cross-sectional area of a $cm^2$) is interposed between the sections A and B. The section A is filled with a gas having a fixed $O_2$ concentration (for example, air or pure oxygen; the partial pressure of oxygen is p atmospheres), and the section B (having a volume of b $cm^3$) is initially purged with nitrogen. After a lapse of unit time (t minutes), the oxygen concentration (C %) of the section B is measured. The oxygen permeability of the film sample is given by the following expression.

$$b \times \frac{C}{100} \times \frac{1}{a} \times \frac{1}{t} \times \frac{1}{p}$$

[$cc/cm^2 \cdot min \cdot O_2$ (1 atm.)]

The oxygen permeability in this invention was measured by the above method.

EXAMPLE D-2

A heat-generating composition composed of 10.0 g of $Na_2S \cdot 5H_2O$, 10.0 g of silica-magnesia and 1.5 g of cobalt oxide (CoO) was prepared in an atmosphere of nitrogen in the same way as in Example D-1. The composition was packed into a bag one surface of which was made of an oxygen-permeable polypropylene non-woven cloth (oxygen permeability 12.6 $cc/cm^2 \cdot min \cdot O_2$ 1 atm.) and the other surface of which was made of an oxygen-impermeable film to form a heat-generating structure. The heat-generating structure was exposed to the air, and the heat-generating temperature was measured in the same way as in Example D-1. While the room temperature was 26° C., the surface temperature of the heat-generating structure rose to 178° C., and a temperature of more than 100° C. was maintained for about 25 minutes.

EXAMPLES D-3 TO D-9

The same polypropylene non-woven cloth as used in Example D-2 was interposed between two 90 micron-thick non-woven cloths made of a blend of polypropylene, polyester and nylon (in a weight ratio of 29:68:3), and the assembly was hot-pressed to form a laminate non-woven cloth. By varying the hot-pressing time and temperature in this procedure, laminate non-woven cloths having a thickness of about 300 microns and various oxygen permeabilities were prepared. Using the laminate non-woven cloths, sheet-like heat-generating structure were made in the same way as in Example D-1. The resulting structures were each exposed to the air, and the heat-generating temperatures were measured. The results are shown in Table 4. The room temperature at the time of measurement was 26° to 28° C.

TABLE 4

| Run No. | Oxygen permeability of the oxygen-permeable material ($cc/cm^2 \cdot min \cdot O_2$ 1 atm.) | Temperature attained (°C.) | Time during which the temperature in the parenthesis was maintained (hours) |
|---|---|---|---|
| D-3 | 1.7 | 73 | (above 60° C.) 2 |
| D-4 | 1.15 | 69 | (above 50° C.) 2.5 |
| D-5 | 0.83 | 62 | (above 50° C.) 2.8 |
| D-6 | 0.52 | 56 | (above 50° C.) 3.3 |
| D-7 | 0.31 | 42 | (above 40° C.) 4.0 |
| D-8 | 0.15 | 36 | (above 35° C.) 5.5 |
| D-9 | 0.069 | 32 | (above 31° C.) 8.0 |

EXAMPLES D-10 TO D-12

Each of the heat-generating compositions shown in Table 5 was packed under an atmosphere of nitrogen into a sheet-like bag having a size of 6 cm×9 cm one surface of which was made of the same porous film as used in Example D-1 (oxygen permeability 3.3 $cc/cm^2 \cdot min \cdot O_2$ 1 atm.) and the other surface of which was made of the same oxygen-impermeable film as used in Example D-1. Each of the resulting heat-generating structures was exposed to the air, and its temperature was measured in the same way as in Example D-1. The room temperature at the time of measurement was 28° C. The results are shown in Table 5.

TABLE 5

| Run No. | Heat-generating composition | Temperature attained (°C.) | Time during which the temperature in the parenthesis was maintained (minutes) |
|---|---|---|---|
| D-10 | $Na_2S \cdot 5H_2O$ (10.0 g) Silica-magnesia (10.0 g) $Ni(OCOCH_3)_2 \cdot 4H_2O$ (2.5 g) | 93 | (above 70° C.) 55 |
| D-11 | $Na_2S \cdot 5H_2O$ (10.0 g) $SiO_2 \cdot Al_2O_3$ (1:1) (10.0 g) | 92 | (above 80° C.) 50 |
| D-12 | CoO (1.5 g) $Na_2S \cdot 5H_2O$ (10.0 g) $SiO_2 \cdot Al_2O_3$ (10.0 g) Ferric oxide (2.0 g) | 96 | (above 80° C.) 60 |

EXAMPLE E $Na_2S \cdot 5H_2O$ (1.8 g), 1.0 g of $SiO_2 \cdot MgO$ (58:42), 0.2 g of $Fe_2O_3$, 0.2 g of activated carbon and 0.4 g of wood powder were pulverized and mixed in a mortar in an atmosphere of nitrogen. The mixture was then packed in a small bag made of a polyester-polypropylene-nylon non-woven cloth having an oxygen permeability of 15 $cc/cm^2 \cdot min \cdot O_2$ 1 atm. The bag was sealed into a 500 cc. bag of gas-barrier film (polyester-aluminum laminate film) which ordinally contained air with an oxygen concentration of 20.8%. After a lapse of 1 hour, the oxygen concentration in the bag was measured by a marketed oxygen concentration meter of the zirconia semiconductor type, and found to be 0.03%. After a lapse of 2 hours, no oxygen was detected in the bag.

EXAMPLE F $Na_2S \cdot 5H_2O$ (10.0 g), 10.0 g of $SiO_2 \cdot MgO$ (50:50) and activated carbon in each of the amounts shown in Table 6 were pulverized and mixed in an atmosphere of nitrogen gas. The resulting mixture was placed in a flat bag, 6 cm×9 cm in size, one surface of which was made of an air-permeable non-woven cloth of polyester and polypropylene and the other surface of which was made of an air-impermeable composite film composed of a nylon film and a film of polyvinyl alcohol copolymer having ethylene copolymerized therewith. The end portion of the bag was then heat-sealed to obtain a heat-generating structure. The heat-generating structure was maintained in a nitrogen gas atmosphere.

The heat-generating structure was then exposed to the air, and put stationary on a stainless steel plate having an area of 15 $cm^2$ and a thickness of 0.5 mm with the surface of the impermeable non-woven fabric on top. A thermometer was interposed between the heat-generating structure and the stainless steel plate, and the heat-generating temperature was measured. The odor of the heat-generating structure was also examined. The results are shown in Table 6.

TABLE 6

| Run No. | Activated carbon (g) | Temperature reached (°C.) | Time during which the reached temperature was maintained (minutes) | Remarks |
|---|---|---|---|---|
| F-1 | 0 | 92 | 20 | Sulfur-like smell |
| F-2 | 0.1 | 89 | 21 | Weak sulfur-like smell |
| F-3 | 0.5 | 89 | 18 | Scarcely odoriferous |
| F-4 | 1.0 | 88 | 15 | Not odoriferous |
| F-5 | 1.5 | 86 | 12 | Not odoriferous |

EXAMPLE G

The alkali metal sulfides (A), the oxidation promoters (B), the oxidation promoter aids (C) and the fillers (D+E) indicated in Table 7 were mixed and pulverized by an agate mortar in an atmosphere of nitrogen. The resulting mixtures were each exposed to an oxygen atmosphere at 25° C. and 1 atm. The results are shown in Table 7.

TABLE 7

| Run No. | (A) (g) | (B) (g) | (C) (mg) | (D) + (E) (g) | | Exposure time (hrs.) | Amount of oxygen absorbed (ml) |
|---|---|---|---|---|---|---|---|
| G-1 | Na$_2$S (0.3) | SiO$_2$ . MgO (58:42) (0.4) | MnO$_2$ (50) | MgSO$_4$, (0.20) | Na$_2$SO$_4$ . 10H$_2$O (0.10) | 1/30 | 86 |
| G-2 | K$_2$S (0.4) | Molecular sieve 4 A (0.4) | MnO$_2$ (50) | ZnO$_2$, (0.20) | Na$_2$SO$_4$ . 10H$_2$O (0.10) | ½ | 22 |

EXAMPLE H

Na$_2$S.5H$_2$O (18.0 g), 10.0 g of SiO$_2$.MgO (58:42), 2.0 g of Fe$_2$O$_3$, 1.8 g of activated carbon, 0.3 g of unrefined rice powder and 4 g of wood powder were pulverized and mixed in an atmosphere of nitrogen gas to form a heat-generating composition. Separately, a bag having a size of 8.5 cm×11 cm was prepared one surface of which was made of a laminate having an oxygen permeability of 2.0 ml/cm$^2$·min.·O$_2$ 1 atm. consisting of, laminated from outside toward inside, flannel (a cotton cloth with one napped surface), a polyester/nylon/polypropylene non-woven cloth having an oxygen permeability of 15 ml/cm$^2$·min.·O$_2$ 1 atm., and a 70 micron-thick perforated polyethylene film having 23 holes having a diameter of 6 mm, and the other surface of which was made of an air-impermeable laminate film consisting of, laminated from outside toward inside, a polyethylene film having a thickness of 60 microns, an aluminum foil having a thickness of 12 microns, a polyethylene film having a thickness of 20 microns and a polyester film having a thickness of 16 microns. The heat-generating composition was put into the bag, and the bag was heat-sealed at its end. The entire structure was then pressed to a thickness of 4.0 mm to make a heat-generating structure.

An adhesive (AP-1, a product of Takemoto Yushi K.K.) was applied to the outside of the impermeable surface of the heat-generating structure, and the heat-generating structure was taken out into the open atmosphere. A pack layer obtained by coating a cloth to a thickness of about 1 mm with a poultice consisting of kaolin, gelatin, carboxymethyl cellulose, sorbitol and water as major ingredients and small amounts of methanol and methyl salicylate was bonded to the heat-generating structure through the adhesive. Immediately then, the resulting assembly was placed stationary on a wooden plate disposed in a room at 17° C. The temperature of the lower, pack layer side was measured. In about 30 minutes, the temperature reached 40° C., and a temperature of more than 40° C. was maintained for 120 minutes. The maximum temperature reached was 46° C.

What we claim is:

1. An oxygen scavenger composition consisting essentially of
    (I) as essential components,
        (a) an alkali metal sulfide expressed by the following formula (1)

$$M_2S_x \qquad (1)$$

wherein M represents an alkali metal, and x is a positive number of 1 to 10,
        (b) at least one oxidation promoter selected from the group consisting of silica, alumina, silica-alumina, silica-magnesia and a naturally occurring or synthetic material containing at least 50% by weight of one of silica, alumina, silica-alumina or silica-magnesia as a main ingredient; and
    (II) as optional components,
        (c) at least one oxidation promoter aid selected from the group consisting of copper, cerium, tin, lead, chromium, selenium, tellurium, manganese, rhenium, iron, cobalt, nickel, ruthenium, rhodium, palladium, osmium, iridium, and platinum, and compounds of these metals, and/or
        (d) a water-insoluble or sparingly water-soluble, inert filler, and/or
        (e) water in a hydrous or hydrated condition and the amount of the component (a) being 5 to 90% by weight based on the entire composition, the amount of the component (b) or both the component (b) and the component (c) being at least 10 parts by weight per 90 parts by weight of the component (a), the amount of the component (c) being 1 to 100 parts by weight per 100 parts by weight of the component (b), the amount of the component (d) being 1 to 90% by weight based on the entire composition, and the amount of the component (e) being 2 to 75% by weight based on the entire composition.

2. The composition of claim 1 which consists essentially of the alkali metal sulfide (a) and the oxidation promoter (b).

3. The composition of claim 1 which consists essentially of the alkali metal sulfide (a), the oxidation promoter (b) and the oxidation promoter aid (c).

4. The composition of claim 1 which consists essentially of the alkali metal sulfide (a), the oxidation promoter (b), the oxidation promoter aid (c) and water (e).

5. The composition of claim 1 which consists essentially of the alkali metal sulfide (a), the oxidation promoter (b), the oxidation promoter aid (c), the filler (d) and the water (e).

6. The composition of any one of claims 1, 2, 3, 4, or 5 wherein in formula (1) M is sodium.

7. The composition of any one of claims 1, 2, 3, 4 or 5 wherein the oxidation promoter (b) is silica-alumina or silica-magnesia.

8. The composition of any one of claims 1, 2, 3, 4 or 5 wherein the oxidation promoter aid (c) is any of said metals, or an oxide, hydroxide, carbonate, mineral acid salt or $C_1$–$C_{20}$ organic monocarboxylate salt of any of said metals.

9. The composition of claim 8 wherein the oxidation promoter aid (c) is a metal selected from the group consisting of copper, cerium, lead, selenium, manganese, iron, cobalt, nickel and palladium, or an oxide, carbonate, mineral acid salt or $C_1$–$C_{20}$ organic monocarboxylate salt of said metal.

10. The composition of any one of claims 1, 2, 3, 4 or 5 wherein the water (e) is the one which maintains a hydrated condition.

11. The composition of claim 1 or 2 wherein the amount of the alkali metal sulfide (a) is 10 to 80% by weight.

12. A heat-generating composition which is the oxygen scavenging composition of claim 1 and is capable of scavenging at least 5 ml of oxygen per gram of the composition in the air at 20° C. during the period of one hour after oxidation reaction has substantially begun.

13. The composition of claim 12 which consists essentially of (a') a sulfide of sodium or potassium, (b') silica-alumina or silica-magnesia, and (e') water as the hydrate of said sulfide, and as optional components, (c') a metal selected from the group consisting of copper, cerium, lead, selenium, manganese, iron, cobalt, nickel and palladium, or an oxide thereof, and (d') a water-insoluble or sparingly water-soluble, inert filler.

14. The composition of claim 13 wherein the amount of the sodium or potassium sulfide is 15 to 75% by weight based on the entire composition.

15. A heat-generating structure comprising the heat-generating compositon of claim 12 and a film having an oxygen permeability of 0.01 to 50 cc/cm$^2$·min.·O$_2$ partial pressure (1 atm.), said film covering said composition over an area of 0.2 to 10 cm$^2$ per gram of said composition.

* * * * *

UNITED STATES PATENT AND TRADEMARK OFFICE
CERTIFICATE OF CORRECTION

PATENT NO. : 4,317,742
DATED : March 2, 1982
INVENTOR(S) : YAMAJI ET AL.

It is certified that error appears in the above—identified patent and that said Letters Patent is hereby corrected as shown below:

On the title page Insert:

-- [30] Foreign Application Priority Data

July 27, 1978    Japan    53-90906

August 3, 1978    Japan    53-94093 --

Signed and Sealed this

Third Day of August 1982

[SEAL]

*Attest:*

*Attesting Officer*

GERALD J. MOSSINGHOFF
*Commissioner of Patents and Trademarks*